US011133555B2

(12) United States Patent
Suzuki et al.

(10) Patent No.: US 11,133,555 B2
(45) Date of Patent: Sep. 28, 2021

(54) BATTERY DEVICE

(71) Applicant: TOYOTA JIDOSHA KABUSHIKI KAISHA, Toyota (JP)

(72) Inventors: Yusuke Suzuki, Nagakute (JP); Atsushi Yamanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 16/673,282

(22) Filed: Nov. 4, 2019

(65) Prior Publication Data

US 2020/0227701 A1 Jul. 16, 2020

(30) Foreign Application Priority Data

Jan. 15, 2019 (JP) .............................. JP2019-004193

(51) Int. Cl.
*H01M 50/20* (2021.01)
*H01M 10/6556* (2014.01)
*H01M 10/625* (2014.01)
*H01M 10/613* (2014.01)
*H01M 10/6569* (2014.01)

(52) U.S. Cl.
CPC ......... *H01M 50/20* (2021.01); *H01M 10/613* (2015.04); *H01M 10/625* (2015.04); *H01M 10/6556* (2015.04); *H01M 10/6569* (2015.04); *H01M 2220/20* (2013.01)

(58) Field of Classification Search
CPC ............. H01M 50/20; H01M 10/6556; H01M 10/625; H01M 10/613; H01M 10/6569; H01M 2220/20; H01M 10/6555; H01M 10/0472
See application file for complete search history.

(56) References Cited

U.S. PATENT DOCUMENTS

| 2011/0003187 A1* | 1/2011 | Graaf ................. H01M 10/625 429/120 |
| 2016/0204488 A1 | 1/2016 | Arai et al. |
| 2017/0237130 A1* | 8/2017 | Kim ................. H01M 10/6556 429/120 |
| 2018/0331336 A1* | 11/2018 | Choi ................... H01M 10/625 |

FOREIGN PATENT DOCUMENTS

| JP | 2006-185815 A | 7/2006 |
| JP | 2007-227030 A | 9/2007 |
| JP | 2008-103248 A | 5/2008 |
| JP | 2009-277471 A | 11/2009 |
| JP | 5942943 B2 | 6/2016 |

* cited by examiner

*Primary Examiner* — Stewart A Fraser
(74) *Attorney, Agent, or Firm* — Sughrue Mion, PLLC

(57) ABSTRACT

A battery device includes: a battery stack including a plurality of battery cells arranged along a predetermined straight direction; a pair of end members that are spaced apart from each other in the straight direction and sandwich the battery stack to prevent battery cells from moving; a temperature adjusting part which includes a heat exchange part for exchanging heat with the battery stack and a flowing passage in which a fluid for exchanging heat with the heat exchange part is flowing; and an end member fixing part to which the end members are fixed. The temperature adjusting part and the end member fixing part are integrally united into a single piece structure made of metal.

7 Claims, 17 Drawing Sheets

BATTERY DEVICE

BACKGROUND OF THE INVENTION

1. Field of the Invention

The present invention relates to a battery device/apparatus for holding a battery (battery stack) including a plurality of battery cells arranged along a straight line and regulating a temperature of the battery.

2. Description of the Related Art

A conventional battery device, mounted on an electric vehicle, a hybrid vehicle, or the like, includes a battery stack which has a plurality of battery cells arranged along a straight line in a battery cell thickness direction. The battery cell discharges electricity and is charged, utilizing chemical reactions of chemical compounds/substances stored therein. Thus, the battery cell expands when discharging electricity and/or when being charged. A repetition of expansion and contraction of the battery cell may damage the battery cell physically and/or may cause a performance of the battery to become unstable due to a change in a distance between electrodes in the battery cell. In view of the above, the conventional battery device includes a battery cell holding member for regulating/restraining the expansion of the battery cell which would occur when the battery cell is discharging electricity and/or when the battery cell is being charged.

Furthermore, the temperature of the battery cell rises due to the chemical reactions occurring in the battery cell. The performance of the battery may be deteriorated when the temperature of the battery cell remains high for a long time. In view of the above, the conventional battery device typically includes a cooler (cooling device) for cooling the battery stack (refer to Japanese Patent No. 5942943).

SUMMARY OF THE INVENTION

In order to hold and cool the battery cells, as shown in FIG. 22, a battery device 100 may be configured to comprise a battery stack 101 including a plurality of battery cells 102 arranged along/in a direction indicated by an arrow A, a pair of cooling devices 104, a pair of end members 103, and four of end member fixing members (fixtures) 105.

One of the end members 103 is positioned at one of the ends in the direction indicated by the arrow A of the battery stack 101. The other one of the end members 103 is positioned at the other one of the ends in the direction indicated by the arrow A of the battery stack 101.

As shown in FIG. 23, one of the cooling devices 104 is disposed so as to contact one of side surfaces of the battery stack 101, and the other one of the cooling devices 104 is disposed so as to contact the other one of the side surfaces of the battery stack 101. A refrigerant (cooling medium) flows through inside of each of the cooling devices 104. Four of the end member fixing members 105 are disposed at four corners of the battery stack 101. Inner surfaces of the end member fixing members 105 contact the battery stack 101. Furthermore, as shown in FIG. 24, four corners of one of the end members 103 are fixed to the inner surfaces of the end member fixing members 105, and four corners of the other one of the end members 103 are also fixed to the inner surfaces of the end member fixing members 105.

The battery cells 102 adjacent to each other (in actuality, insulator covers which are attached to the battery cells 102 and adjacent to each other) contact each other. one of the end members 103 contacts one end in the direction indicated by the arrow A of the battery stack 101, and the other one of the end members 103 contacts the other one end in the direction indicated by the arrow A of the battery stack 101. Accordingly, a pair of the end members physically restrain (prevent) the expansion of the battery cells 102 in the battery cell thickness direction (i.e., the direction indicated by the arrow A) when the battery cells 102 are discharging electricity and/or are being charged. Moreover, each of the battery cells 102 is cooled by the cooling devices 104.

As understood from the above, the cooling device 104 and the end member fixing member 105 are separated from each other. Therefore, the parts count of the battery device 100 (i.e., the number of parts for the battery device 10) is large and the manufacturing cost of the battery device 100 is high.

The present invention has been made to solve the above-mentioned problems that the battery device 100 has. That is, one of objects of the present invention is to provide a battery device that can regulate the temperature of a battery stack and can physically restrain the expansion of the battery cells, with fewer parts count and with lower manufacturing cost.

A battery device/apparatus according to the present invention comprises:

a battery stack (21A, 21B, 21C) including a plurality of battery cells (22) arranged along a predetermined straight direction;

a pair of end members (50) that are spaced apart from each other in the straight direction and sandwich the battery stack in the straight direction to prevent each of the battery cells from moving in the straight direction;

a temperature adjusting part (30A1, 30B1), which includes a heat exchange part (30A1a, 30B1a) for exchanging heat with the battery stack and a flowing passage (39j, 39h, 39i) (in its inside) in which a fluid for exchanging heat with the heat exchange part is flowing; and an end member fixing part (31, 32, 95A2) to which a pair of the end members are fixed.

Furthermore, the temperature adjusting part and the end member fixing part are integrally united into a single piece structure (30, 95) made of metal.

In the present battery device, the temperature adjusting part regulates/adjusts the temperature of the battery stack, and a pair of the end members restrain each of the battery cells from moving in the straight direction.

In addition, the single piece structure made of metal integrally includes the temperature adjusting part and the end member fixing part. Therefore, the parts count of the battery device (the number of parts for the battery device) is small and the manufacturing cost for the device is low.

In one of embodiments of the present invention, the single piece structure is configured to form the heat exchange part contacting a side surface of the battery stack which is placed at a side of the temperature adjusting part. The heat exchange part is a part of at least one of side surfaces of the temperature adjusting part.

In the above embodiment, the heat exchange part is placed at the side of the battery stack. Therefore, as compared with a device where the heat exchange part is placed under the battery stack so that the heat exchange part contacts the bottom surface of the battery stack, the above embodiment can reduce an upper-lower (vertical) dimension/length of the battery device.

In one of embodiments of the present invention,
 the end member fixing part includes:
  an upper restraining part (31), extending in one of side directions (that are orthogonal to the straight direction and the an upper-lower direction) from the temperature adjusting part and facing an upper surface of the battery stack from above, to which upper surfaces of the end members are fixed; and a lower restraining part (32), extending in the one of the side directions from the temperature adjusting part and facing a lower surface of the battery stack from below, to which lower surfaces of the end members are fixed.

According to the above embodiment, the upper restraining part and the lower restraining part can effectively prevent the battery stack from vibrating vertically.

In one of embodiments of the present invention, the end member fixing part includes a pair of the upper restraining parts (31) and a pair of the lower restraining parts (32), one of the upper restraining parts extending in the one of the side directions, and the other one of the upper restraining parts extending in the other one of the side directions, and one of the lower restraining parts extending in one of the side directions, and the other one of the lower restraining parts extending in the other one of the side directions.

Two pairs of the end members can be held/secured by the upper restraining parts extending in both of the side directions and the lower restraining parts extending in both of the side directions. Therefore, the single piece structure of the above embodiment can hold two of the battery stacks.

In one of embodiments of the present invention, the single piece structure includes a first member (front member 30A) and a second member (rear member 30B), each being a press formed piece, one of surfaces as a first facing surface of the first member faces one of surfaces as a second facing surface of the second member, the first member has a first concave part (39) on the first facing surface, the second member has a second concave part (39) on the second facing surface, and the first concave part and the second concave part form the flowing passage therebetween when the first member and the second member are connected to each other.

In the above embodiment, each of the first member and the second member is a press formed piece. Therefore, the manufacturing cost for the temperature adjusting part can greatly be reduced.

In one of embodiments of the present invention, the first concave part includes a plurality of first upper-lower direction flow passage forming concave parts (39e), each extending an upper-lower direction, that are arranged along the straight direction;

a plurality of parts, each located between the first upper-lower direction flow passage forming concave parts adjacent to each other, constitute a plurality of first ribs (38), each extending the upper-lower direction;

the second concave part includes a plurality of second upper-lower direction flow passage forming concave parts (39e), each extending the upper-lower direction, that are arranged along the straight direction, the number of the second upper-lower direction flow passage forming concave parts being the same as the number of the first upper-lower direction flow passage forming concave parts;

a plurality of parts, each located between the second upper-lower direction flow passage forming concave parts adjacent to each other, constitute a plurality of second ribs (38), each extending the upper-lower direction, the number of the second ribs being the same as the number of the first ribs; and when each of the first ribs and each of the second ribs are fixed to each other, a plurality of upper-lower direction flow passages (39j) are formed by the first upper-lower direction flow passage forming concave parts and the second upper-lower direction flow passage forming concave parts.

In the above embodiment, the first member has a plurality of first ribs, and the second member has a plurality of second ribs. Therefore, the mechanical strength of the temperature adjusting part can be enhanced.

In one of embodiments of the present invention, the fluid is a refrigerant changing between a liquid phase fluid and a gas phase fluid, depending on its temperature, and the end member fixing part is fixed directly to the temperature adjusting part.

In the above embodiment, the end member fixing part is rigidly fixed to the temperature adjusting part. Thus, the end member can be firmly supported by the end member fixing part.

In the above description, references used in the following descriptions regarding embodiments are added with parentheses to the elements of the present invention, in order to assist in understanding the present invention. However, those references should not be used to limit the scope of the invention. Other objects, other features, and accompanying advantages of the present invention will be readily understood from the description of embodiments of the present invention to be given referring to the following drawings.

DETAILED DESCRIPTION OF THE EMBODIMENT

Figure 1:
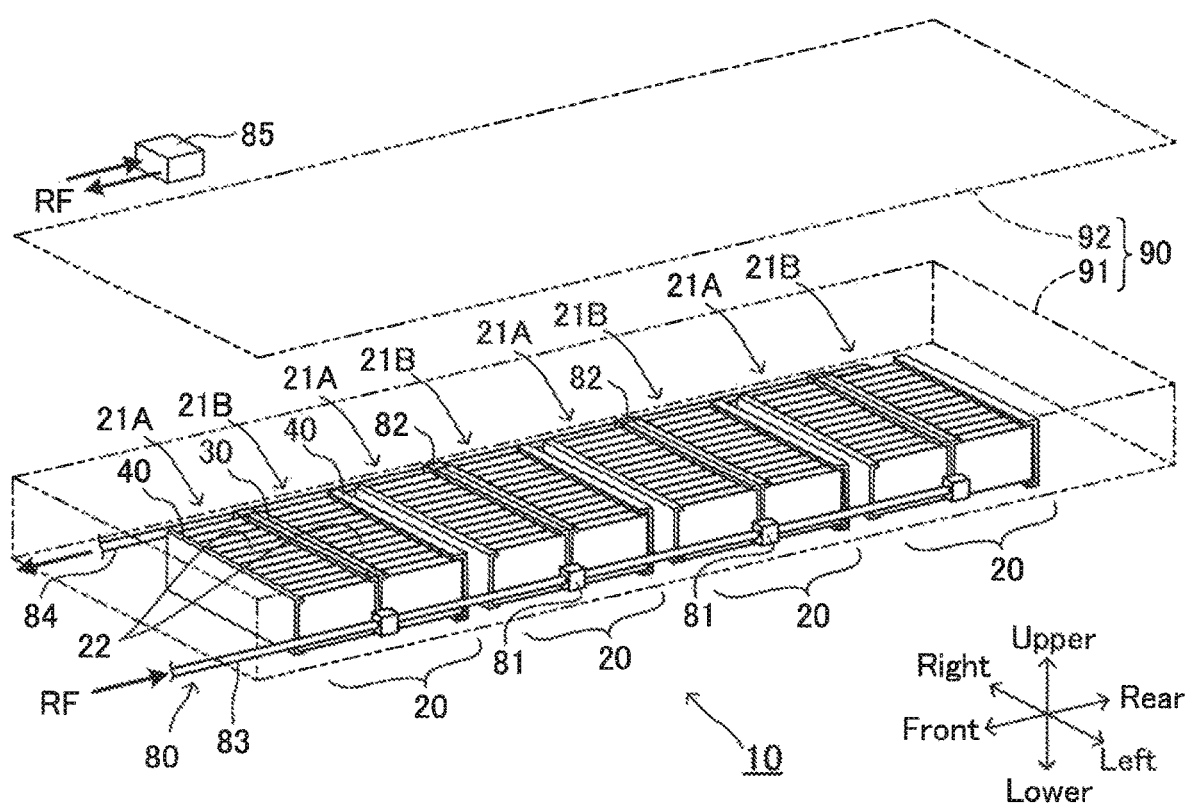
FIG. 1 is a perspective view of a battery device according to an embodiment of the present invention, wherein a cover is omitted.

As shown in FIG. 1, a battery device/apparatus 10 according to an embodiment of the present invention includes a plurality (e.g., four) of battery modules 20, a plurality (e.g., four) of elongated members 30, a plurality (e.g., eight) of restraining members 40, and a fluid circulation unit 80. The battery device 10 is mounted on a vehicle such as an electric vehicle (EV), and a hybrid vehicle (HV or PHV).

Each of the battery modules 20 includes a first battery stack 21A and a second battery stack 21B.

The first battery stack 21A is a cell group including a plurality of battery cells (and covers 23 which will be described later). The first battery stack 21A is disposed in such a manner that its front surface faces a rear surface of the front restraining member 40 (i.e., the restraining member 40 located at the front side) and its rear surface faces a front surface of the elongated member 30.

The second battery stack 21B is also a cell group including a plurality of battery cells (and covers 23 which will be described later). The second battery stack 21B is disposed in such a manner that its front surface faces a rear surface of the elongated member 30 and its rear surface faces a front surface of the rear restraining member 40 (i.e., the restraining member 40 located at the rear side).

Figure 2:
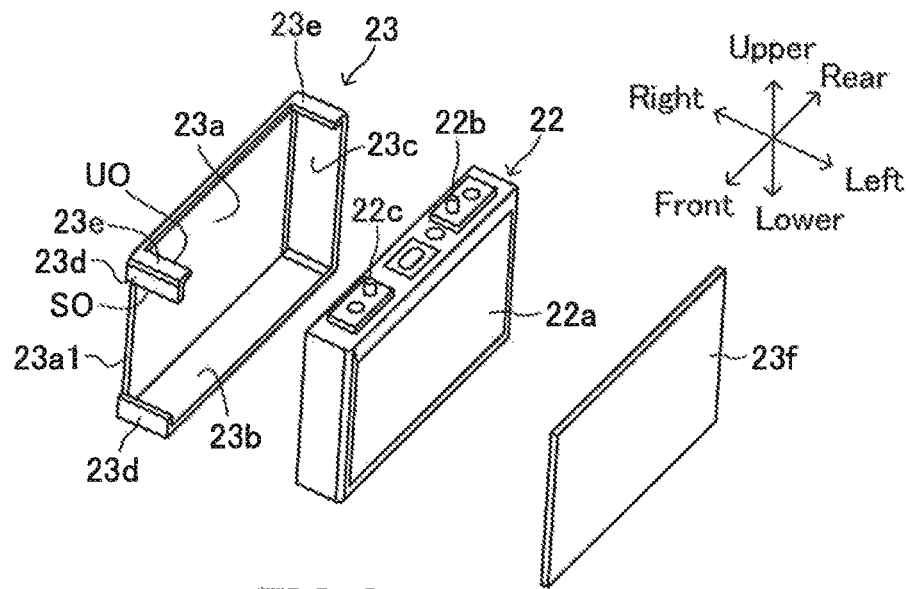
FIG. 2 is an exploded perspective view of the battery cell shown in FIG. 1 and a insulator cover attached to the battery cell.

The battery cell 22 is a secondary battery. As shown in FIG. 2, the battery cell 22 includes a case 22a, a positive electrode terminal 22b, and a negative electrode terminal 22c. The case 22a is made of metal and has a substantially rectangular parallelepiped shape. The positive electrode terminal 22b and the negative electrode terminal 22c are provided on the upper surface of the case 22a.

Figure 3:
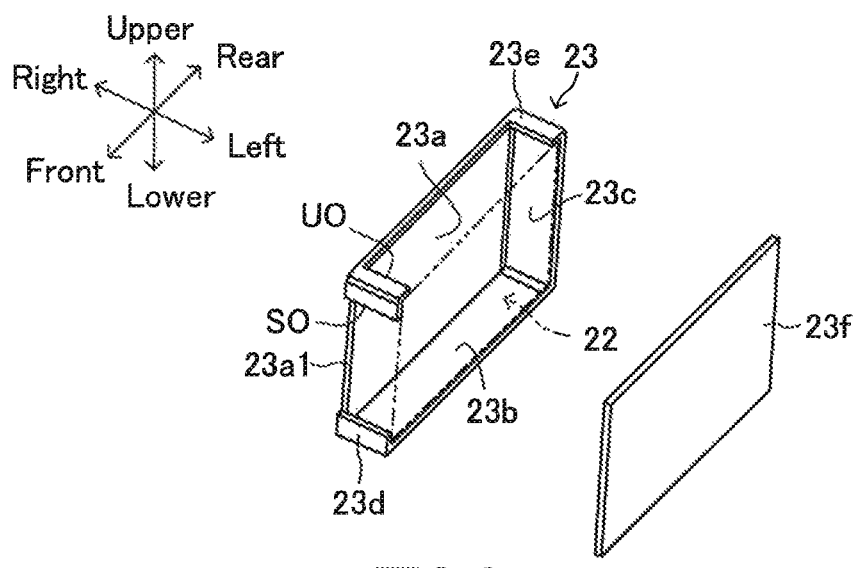
FIG. 3 is a perspective view of the battery cell and the cover shown in FIG. 2.

As shown in FIGS. 2 and 3, the cover 23 is attached to each of the battery cells 22 included in the second battery stack 21B. It should be noted that the cover 23 is not illustrated in FIGS. 1, 4, and 5, for simplification. The cover 23 is made of an insulating material (e.g., resin), and is substantially rectangular parallelepiped like the case 22a (battery cell 22).

The cover 23 includes a base part 23a, a bottom plate part 23b, an outer part 23c, an inner part 23d, a ceiling part 23e, and a lid plate 23f.

The cover 23 in the second battery stack 21B has the following configurations. The base part 23a constitutes a right side wall of the cover 23. The bottom plate part 23b constitutes a bottom wall connected to the lower end of the base part 23a. The outer part 23c constitutes an outer wall extending upward from the rear end of the bottom plate part 23b. The inner part 23d constitutes an inner wall extending upward from the front end of the bottom plate part 23b. A sheet mounting opening SO is formed in a part of the inner part 23d so that only both upper and lower end parts of the inner part 23d are remaining. The ceiling part 23e constitutes an upper wall connected to the upper end of the base part 23a. The rear end part of the ceiling part 23e is connected to the upper end part of the outer part 23c, and the front end part of the ceiling part 23e is connected to the upper end part of the inner part 23d. An electrode exposure opening UO is formed in a part of the ceiling part 23e so that only both of the front and rear end parts of the ceiling part 23e are remaining. The front end surface 23a1 of the base part 23a is positioned slightly rearward of (or with respect to) the inner part 23d. Although not shown, the cover 23 attached to each of the battery cells 22 used in the first battery stack 21A and the cover 23 shown in FIG. 2 are symmetrical with respect to a line along a left-right direction (symmetrical in a front-rear direction).

The cover 23 is attached to the battery cell 22 in the second battery stack 21B. The right side surface of the case 22a contacts the left side surface of the base part 23a. The bottom surface of the case 22a is covered by the bottom plate part 23b. The rear surface of the case 22a is covered by the outer part 23c. Both of the upper and lower end parts of the front surface of the case 22a are covered by the inner part 23d. The front and rear end parts of the upper surface of the case 22a are covered by the ceiling part 23e. The positive electrode terminal 22b and the negative electrode terminal 22c are exposed above the cover 23 through the electrode exposure opening UO. The lid plate 23f is attached to the opening of the left side surface of the cover 23. The lid plate 23f has the same shape as the opening of the left side surface of the cover 23, and is made of the same material as the cover 23. Therefore, the left side surface of the case 22a contacts the right surface of the lid plate 23f. In the first battery stack 21A, the cover 23 for the first battery stack 21A is attached to each of the battery cells 22.

Figure 4:
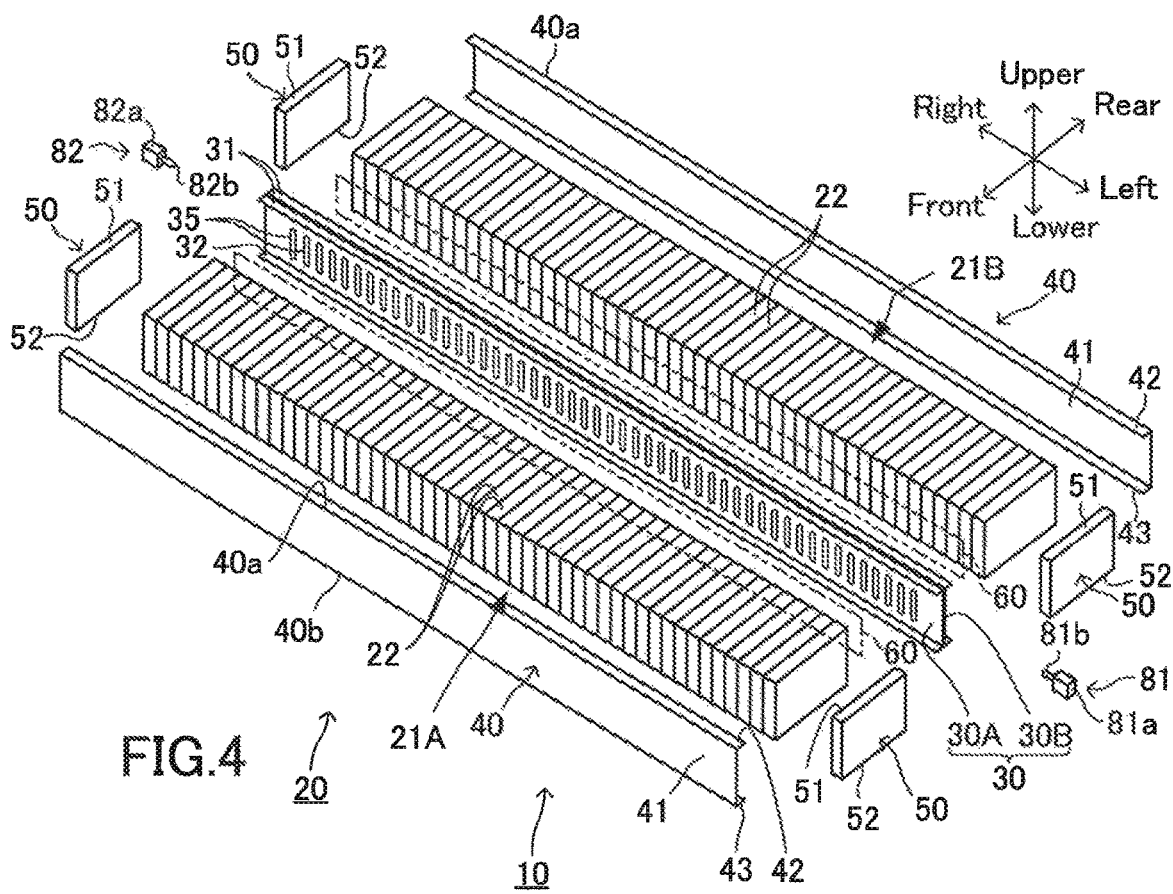
FIG. 4 is a schematic exploded perspective view of the battery module shown in FIG. 1, wherein the cover is omitted.
Figure 5:
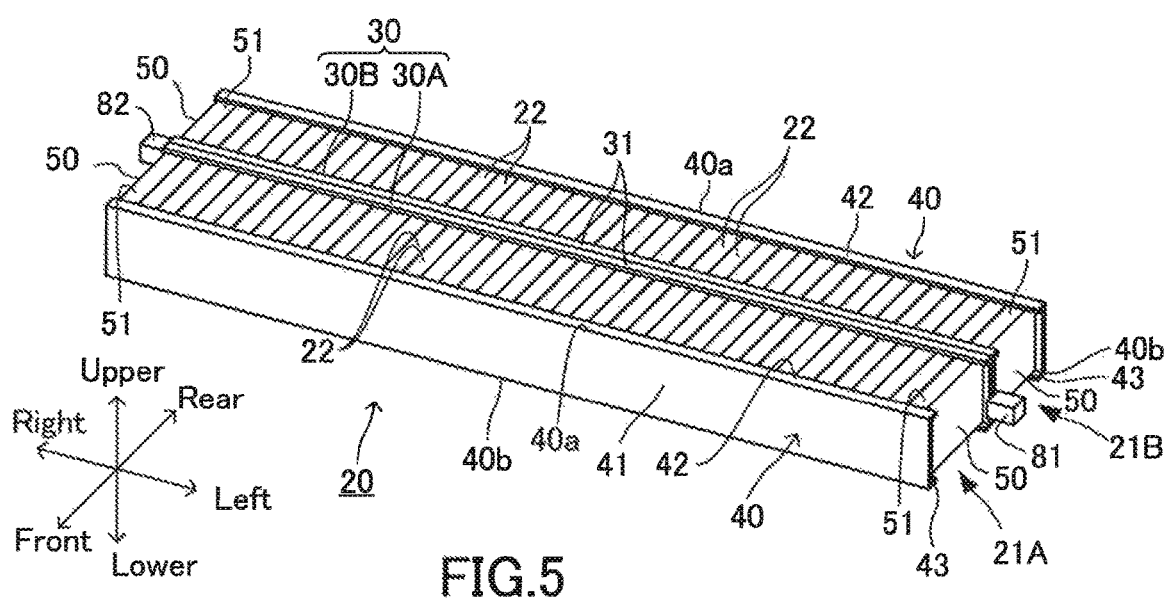
FIG. 5 is a schematic perspective view of the battery module shown in FIG. 1.

As shown in FIGS. 4 and 5, in each of the first battery stack 21A and the second battery stack 21B, a plurality of the battery cells 22 (to which the covers 23 are attached) are arranged along a straight line extending in the left-right direction.

The positive electrode terminals 22b of the battery cells 22 in the first battery stack 21A are connected to each other by an unillustrated bus bar. The negative electrode terminals 22c of the battery cells 22 in the first battery stack 21A are connected to each other by an unillustrated bus bar. Similarly, the positive electrode terminals 22b of the battery cells 22 in the second battery stack 21B are connected to each other by an unillustrated bus bar. The negative electrode terminals 22c of the battery cells 22 in the second battery stack 21B are connected to each other by an unillustrated bus bar. The first battery stack 21A and the second battery stack 21B are connected to an unillustrated charger mounted on the vehicle. When an external power source is connected to the charger, the first battery stack 21A and the second battery stack 21B are charged.

Figure 6:
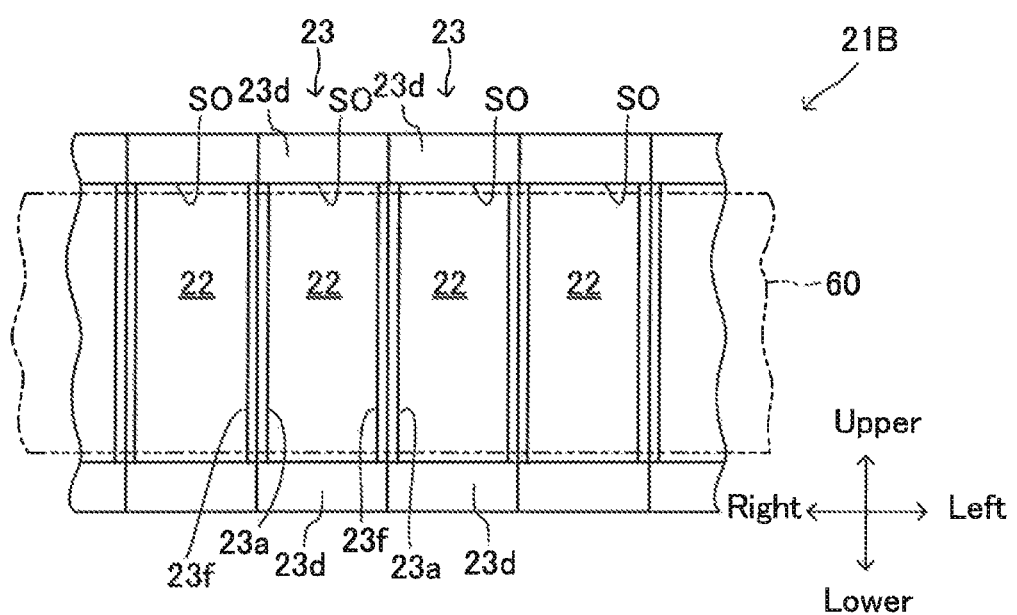
FIG. 6 is a front view of the battery stack and insulating heat transfer sheet shown in FIG. 4.

As shown in FIG. 6, in the second battery stack 21B, the right side of the base part 23a of the certain cover 23 contact the left side surface of the lid plate 23f of the cover 23 adjacent to that certain cover 23. The sheet mounting openings SO of the adjacent covers 23 are continuous with each other in the left-right direction. The same applies to the first stack 21A. That is, in the first battery stack 21A, the sheet mounting openings SO of the adjacent covers are continuous with each other in the left-right direction.

As shown in FIG. 4, the battery device 10 includes a pair of the insulation heat transfer sheets 60. The insulation heat transfer sheet 60 is made of an elastic material having insulating properties and high thermal conductivity. The insulation heat transfer sheet 60 is an elongated member (belt-like sheet) extending in the left-right direction. The left-right dimension (length) of the insulation heat transfer sheet 60 is substantially the same as each of the length of the first battery stack 21A in the left-right direction and the length of the second battery stack 21B in the left-right direction. As shown in FIG. 6, the vertical dimension (width) of the insulation heat transfer sheet 60 is slightly smaller than the vertical dimension of the sheet mounting opening SO. Further, the front-rear dimension (thickness) of the insulation heat transfer sheet 60 is larger than the plate thickness (thickness of the inner part 23d) of the part constituting the sheet mounting opening SO.

As shown in FIG. 6, the insulation heat transfer sheet 60 is disposed along the sheet mounting opening SO in each of the first battery stack 21A and the second battery stack 21B. When the insulation heat transfer sheet 60 is disposed, a part of the insulation heat transfer sheet 60 (a part on the side facing the temperature adjusting member 70) is located outside (protrudes from) each of the covers 23 with respect to the openings SO.

Accordingly, the front surface of the insulation heat transfer sheet 60 on the front side (i.e., the sheet 60 attached to the first battery stack 21A, or the front insulation heat transfer sheet 60) contacts the rear surface of each of the battery cells 22 of the first battery stack 21A. The rear surface of the front insulation heat transfer sheet 60 is located on the rear side of each of the covers 23 of the first battery stack 21A (refer to FIGS. 14 and 15).

Similarly, the front surface of the insulation heat transfer sheet 60 on the rear side (i.e., the sheet 60 attached to the second battery stack 21B, or the rear insulation heat transfer sheet 60) is located on the front side of each of the covers 23 of the second battery stack 21B. The rear surface of the rear insulation heat transfer sheet 60 contacts the front surface of each of the battery cells 22 of the second battery stack 21B (see FIGS. 14 and 15).

The elongated member 30 has functions of adjusting the temperature of each of the first battery stack 21A and the second battery stack 21B and of holding/fixing end members 50. As shown in FIG. 4, the elongated member 30 includes a front member (referred sometimes to as a first member) 30A and a rear member (referred sometimes to as a second member) 30B. Each of the front member 30A and the rear member 30B is made of an iron plate and a single piece made through press forming. The rear member 30B is positioned at immediate rear of the front member 30A. The front member 30A and the rear member 30B are symmetrical with each other with respect to a line along the left-right direction (in front-rear direction), and are positioned so at to face each other. Hereinafter, surfaces of the front member 30A and the rear member 30B that face each other may be referred to as "inner surfaces". Each of a surface of the front member 30A opposite to the inner surface of the front member 30A and a surface of the rear member 30B opposite to the inner surface of the rear member 30B may be referred to as "an outer surface". The length (dimension) in the left-right direction of the elongated member 30 is longer than the length (dimension) in the left-right direction of each of the first battery stack 21A and the second battery stack 21B.

An upper restraining part 31 is formed at an upper end part of each of the front member 30A and the rear member 30B. The upper restraining part 31 extends in the left-right direction along each of the front member 30A and the rear member 30B. The upper restraining part 31 is a flat plate part parallel to a horizontal plane (refer to FIGS. 7 to 10).

As shown in FIGS. 7 to 10, a lower restraining part 32 is formed at a lower end part of each of the front member 30A and the rear member 30B. The lower restraining part 32 extends in the left-right direction along each of the front member 30A and the rear member 30B. The lower restraining part 32 is also a flat plate part parallel to the horizontal plane.

A distance (i.e., an upper-lower direction length) between a lower surface of the upper restraining part 31 and an upper surface of the lower restraining part 32 is slightly longer than a dimension of the cover 23 in the upper-lower direction (vertical direction).

Figure 7:
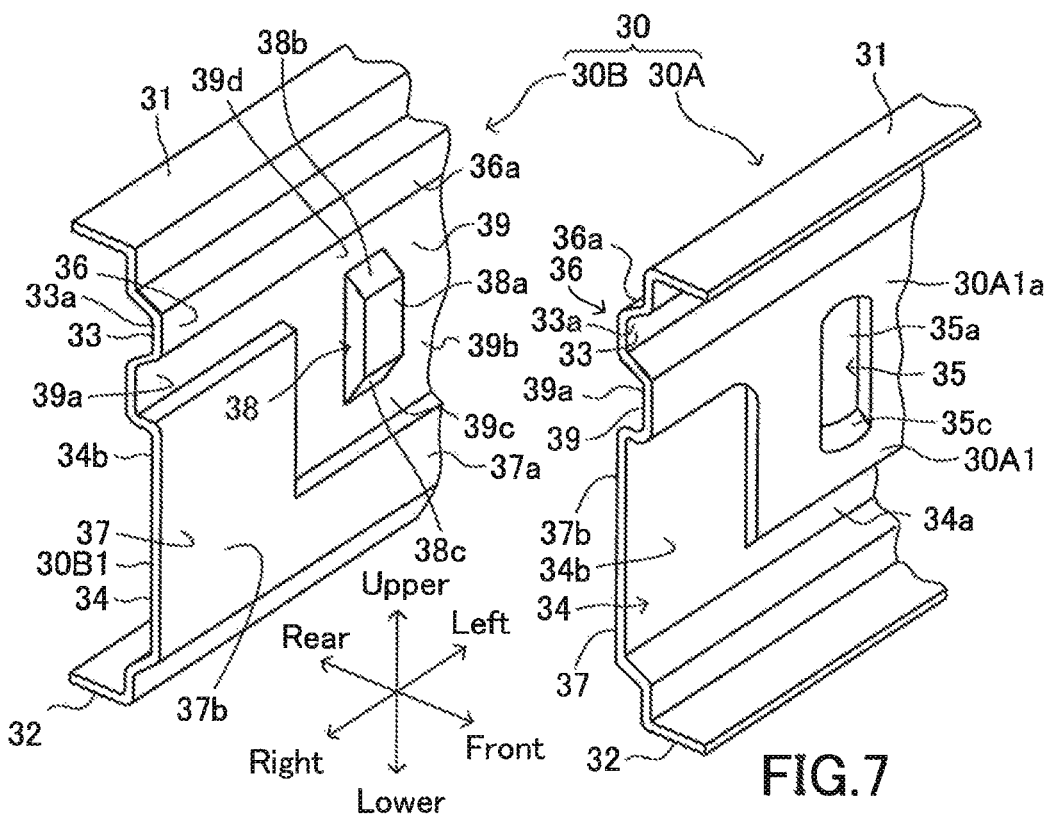
FIG. 7 is an exploded perspective view of a right end part of the elongated member shown in FIG. 2.

As shown in FIG. 7, an upper groove (channel) 33 is formed on the outer surface of the front member 30A. The upper groove 33 of the front member 30A extends along/in the left-right direction of the front member 30A. The upper groove 33 of the front member 30A includes a width-narrow part 33a shown in FIGS. 7, 9, and 13A, and a width-wide part 33b shown in FIGS. 9, and 13A. The width-narrow part 33a of the front member 30A extends linearly in the left-right direction of the front member 30A except in a left end part of the front member 30A. The width-wide part 33b of the front member 30A is formed at the left end part of the front member 30A. An upper-lower dimension of the width-wide part 33b is larger than an upper-lower dimension of the width-narrow part 33a.

Similarly, as shown in FIG. 7, an upper groove (channel) 33 is formed on the outer surface of the rear member 30B. The upper groove 33 of the rear member 30B extends along/in the left-right direction of the rear member 30B. The upper groove 33 of the rear member 30B includes a width-narrow part 33a shown in FIG. 7, and a width-wide part 33b shown in FIG. 9. The width-narrow part 33a of the rear member 30B extends linearly in the left-right direction of the rear member 30B except in a left end part of the rear member 30B. The width-wide part 33b of the rear member 30B is formed at the left end part of the rear member 30B. An upper-lower dimension of the width-narrow part 33a of the rear member 30B is the same as the upper-lower dimension of the width-narrow part 33a of the front member 30A. An upper-lower dimension of the width-wide part 33b of the rear member 30B is the same as the upper-lower dimension of the width-wide part 33b of the front member 30A.

Figure 13A:
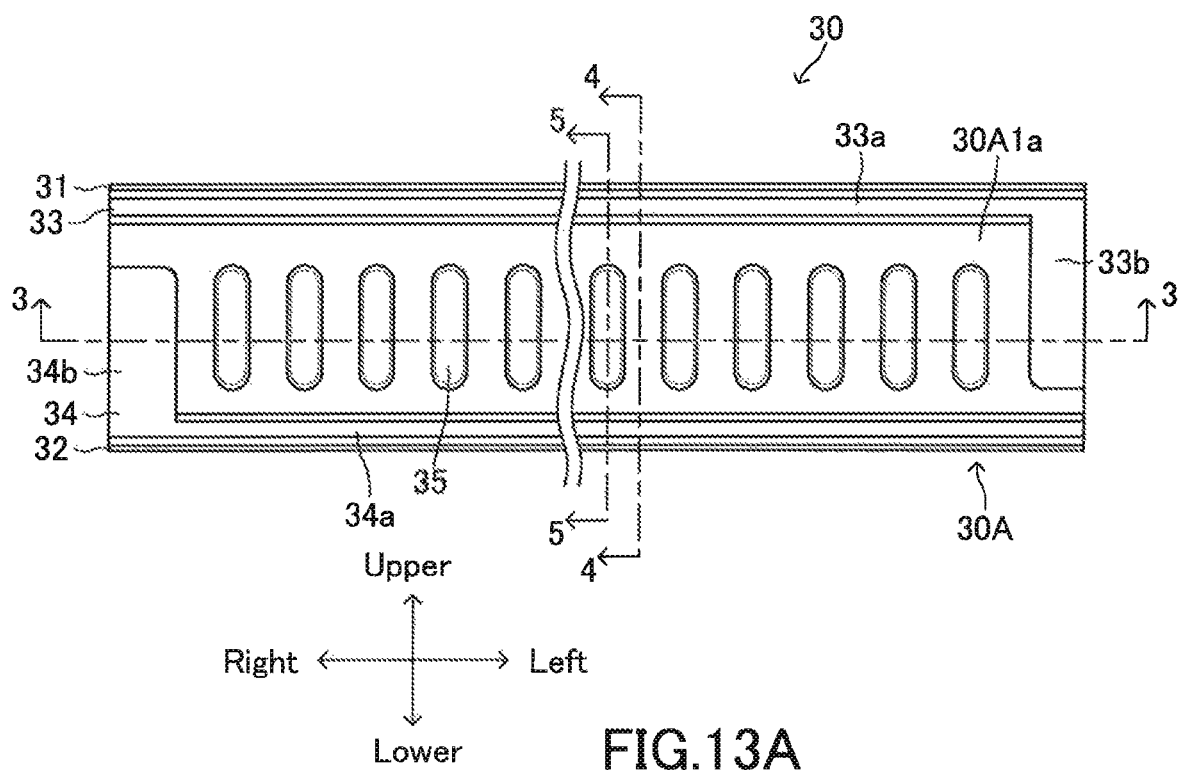
FIG. 13A is a front view of the elongated member shown in FIG. 4.

As shown in FIGS. 7 and 13A, a lower groove (channel) 34 is formed on the outer surface of the front member 30A. The lower groove 34 of the front member 30A extends along/in the left-right direction of the front member 30A. The lower groove 34 of the front member 30A includes a width-narrow part 34a shown in FIGS. 7, 9, and 13A, and a width-wide part 34b shown in FIGS. 7, and 13A. The width-narrow part 34a of the front member 30A extends linearly in the left-right direction of the front member 30A except in a right end part of the front member 30A. The width-wide part 34b of the front member 30A is formed at the right end part of the front member 30A. An upper-lower dimension of the width-wide part 34b is larger than an upper-lower dimension of the width-narrow part 34a.

Similarly, as shown in FIG. 7, a lower groove (channel) 34 is formed on the outer surface of the rear member 30B. The lower groove 34 of the rear member 30B extends along/in the left-right direction of the rear member 30B. The lower groove 34 of the rear member 30B includes a width-narrow part 34a shown in FIG. 9, and a width-wide part 34b shown in FIG. 7. The width-narrow part 34a of the rear member 30B extends linearly in the left-right direction of the rear member 30B except in a right end part of the rear member 30B. The width-wide part 34b of the rear member 30B is formed at the right end part of the rear member 30B. An upper-lower dimension of the width-narrow part 34a of the rear member 30B is the same as the upper-lower dimension of the width-narrow part 34a of the front member 30A. An upper-lower dimension of the width-wide part 34b of the rear member 30B is the same as the upper-lower dimension of the width-wide part 34b of the front member 30A.

As shown in FIG. 4, a large number (a plurality) of rib forming concave parts 35 are formed/provided on the outer surface of the front member 30A at regular intervals in the left-right direction. The rib forming concave parts 35 are positioned around center parts in the upper-lower (vertical) direction of the front member 30A. As shown in FIGS. 7 to 11, a front view shape of the rib forming concave part 35 is substantially rectangular shape having a longitudinal axis extending along the upper-lower (vertical) direction.

Figure 11:
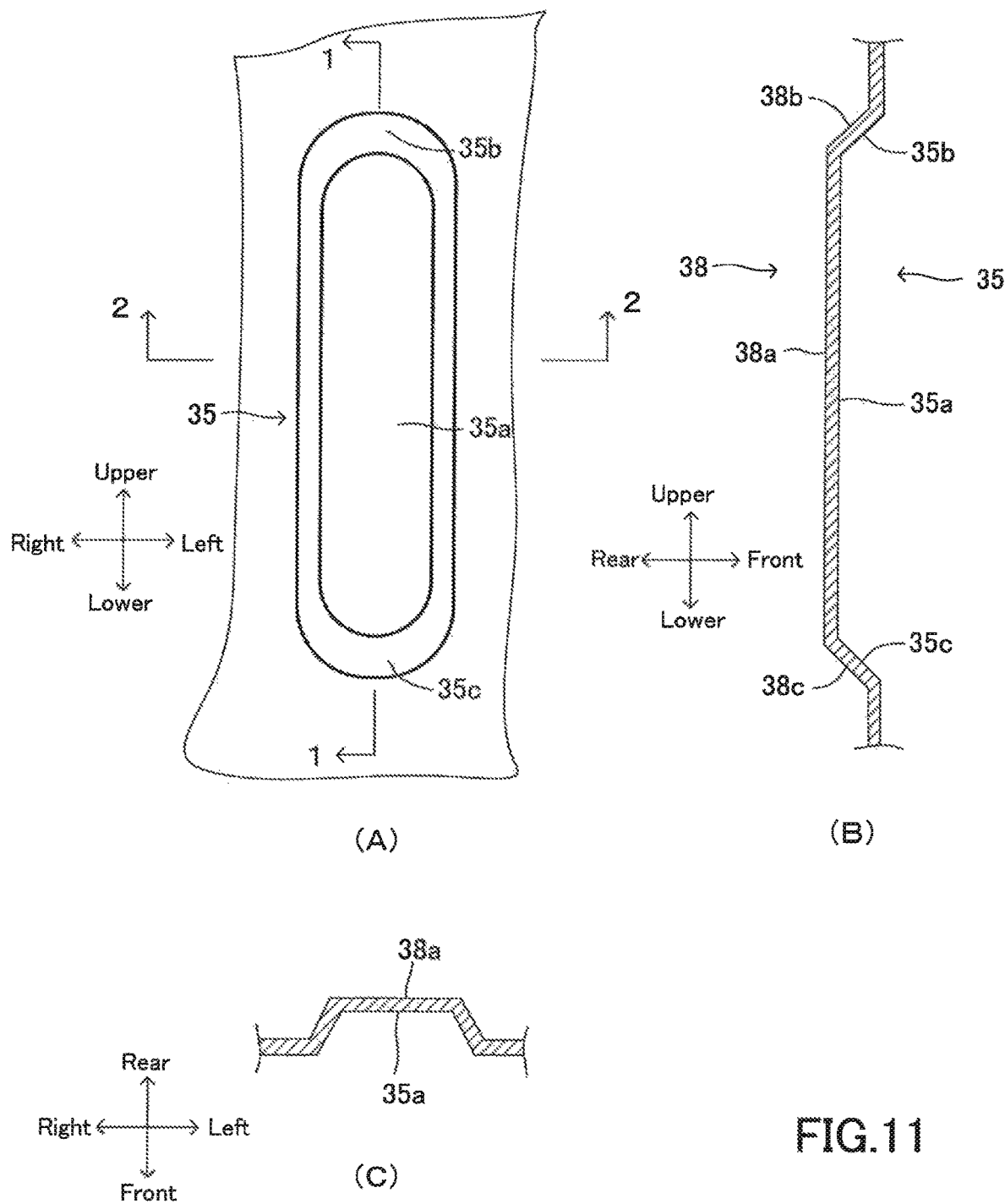
FIG. 11 shows the rib forming concave part shown in FIG. 2, and includes (A), (B), and (C), wherein (A) is a front view of the concave part, (B) is a cross-sectional view taken along the 1-1 line indicated in (A), and (C) is a cross-sectional view taken along the 2-2 line indicated in (A).

More specifically, as shown in (A) of FIG. 11, the front view shape of the rib forming concave part 35 is composed of a rectangular shape having a longitudinal axis extending along the upper-lower (vertical) direction, an arc-like shape connected to an upper part of the rectangular shape and bulging upward, and an arc-like shape connected to a lower part of the rectangular shape and bulging downward. As shown in (B) of FIG. 11, a bottom surface 35a of the rib forming concave part 35 is a flat surface orthogonal to the front-rear direction. An upper inclined surface 35b of the rib forming concave part 35 is continuous with the bottom surface 35a at an upper part of the bottom surface 35a. The upper inclined surface 35b is inclined with respect to the horizontal plane. A lower inclined surface 35c of the rib forming concave part 35 is continuous with the bottom surface 35a at a lower part of the bottom surface 35a. The lower inclined surface 35c is inclined with respect to the horizontal plane.

Similarly, a large number (a plurality) of rib forming concave parts 35 are formed/provided on the outer surface of the rear member 30B at regular intervals in the left-right direction. The rib forming concave parts 35 of the rear member 30B are positioned around center parts in the upper-lower (vertical) direction of the rear member 30B.

Figure 9:
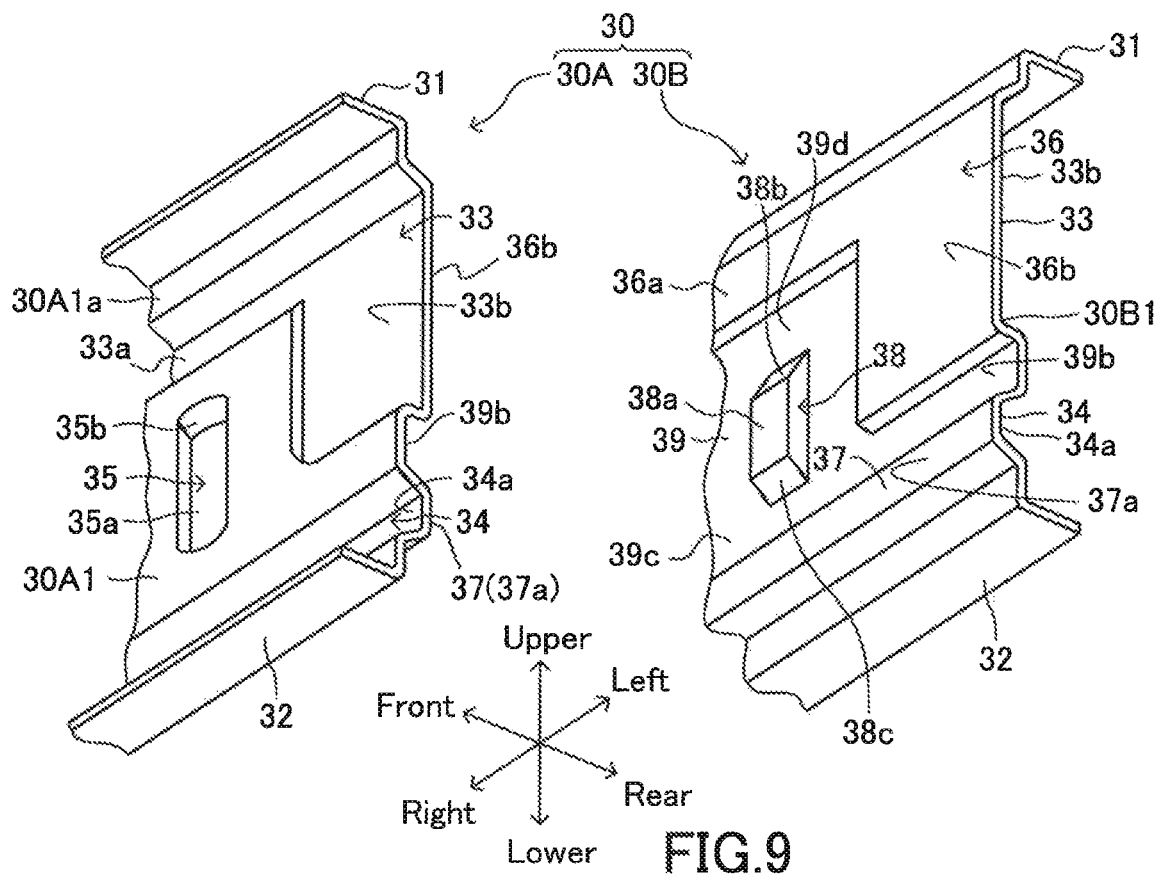
FIG. 9 is an exploded perspective view of a left end part of the elongated member shown in FIG. 2.
Figure 12:
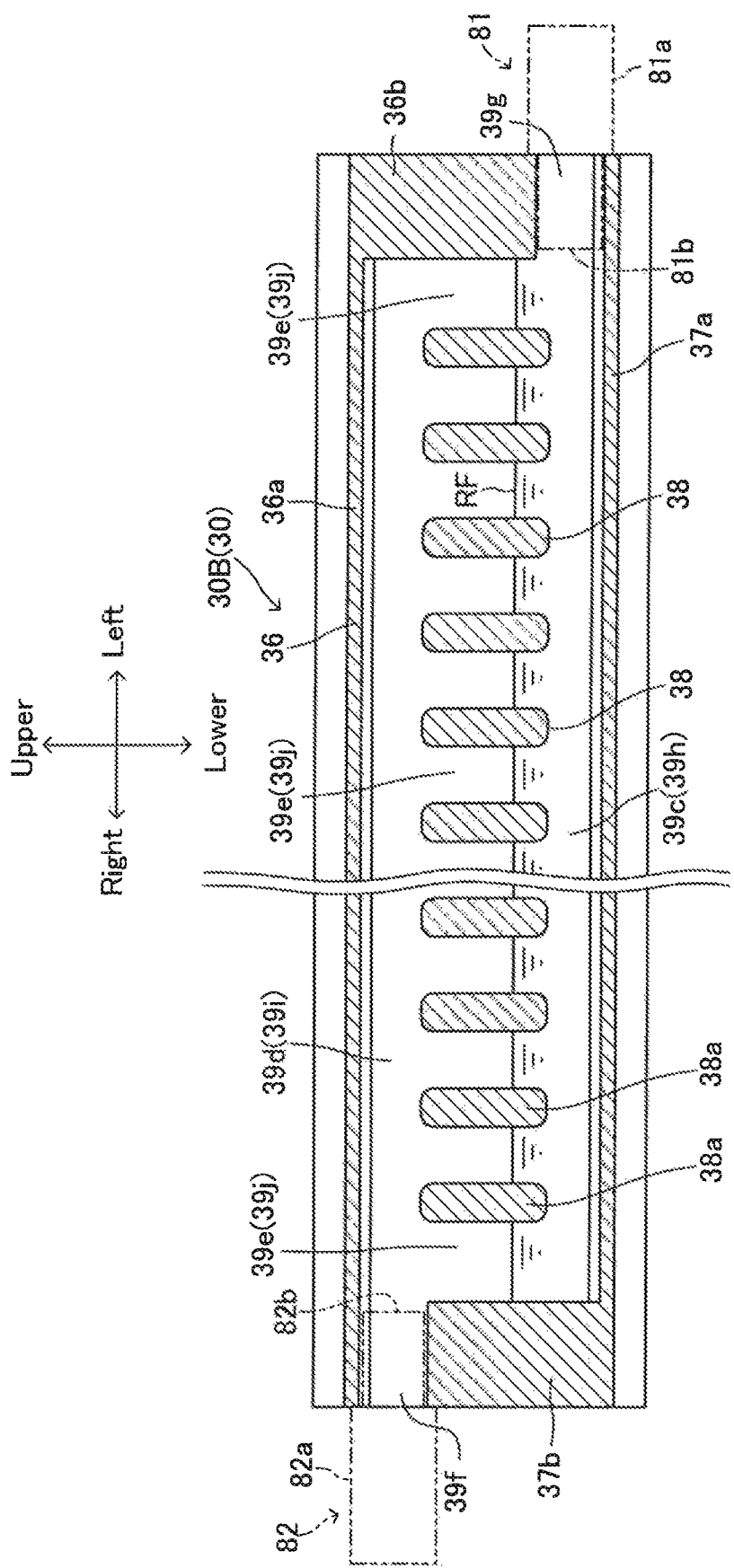
FIG. 12 is a schematic front view of a rear member.

As shown in FIGS. 7, 9, and 12, the upper groove 33 of the front member 30A forms an upper elongated protrusion 36 in/on the inner surface of the front member 30A. A part except an upper edge part and a lower edge part of the upper elongated protrusion 36 forms/constitutes a width-narrow welding plane 36a and a width-wide welding plane 36b. Each of the width-narrow welding plane 36a and the width-wide welding plane 36b is a plane orthogonal to the front-rear direction.

The width-narrow welding plane 36a is formed by the width-narrow part 33a (a part of the width-narrow part 33a except the upper edge part and the lower edge part thereof) in/on the inner surface of the front member 30A. The width-narrow welding plane 36a extends linearly in the left-right direction.

The width-wide welding plane 36b is formed by the width-wide part 33b (a part of the width-wide part 33b except the upper edge part and the lower edge part thereof) in/on the inner surface of the front member 30A. The width-wide welding plane 36b and the width-narrow welding plane 36a are on the same plane.

Similarly, as shown in FIG. 7, the upper groove 33 of the rear member 30B forms an upper elongated protrusion 36 in/on the inner surface of the rear member 30B. As shown in FIGS. 7 and 12, the upper groove 33 of the rear member 30B forms/constitutes a width-narrow welding plane 36a and a width-wide welding plane 36b, as in the similar manner described above. The width-narrow welding plane 36a of the rear member 30B and the width-wide welding plane 36b of the rear member 30B is on the same plane.

As shown in FIGS. 7, 9, and 12, the lower groove 34 of the front member 30A forms a lower elongated protrusion 37 in/on the inner surface of the front member 30A. A part except an upper edge part and a lower edge part of the lower elongated protrusion 37 forms/constitutes a width-narrow welding plane 37a and a width-wide welding plane 37b. Each of the width-narrow welding plane 37a and the width-wide welding plane 37b is a plane orthogonal to the front-rear direction.

The width-narrow welding plane 37a is formed by the width-narrow part 34a (a part of the width-narrow part 34a except the upper edge part and the lower edge part thereof) in/on the inner surface of the front member 30A. The width-narrow welding plane 37a extends linearly in the left-right direction.

The width-wide welding plane 37b is formed by the width-wide part 34b (a part of the width-wide part 34b except the upper edge part and the lower edge part thereof) in/on the inner surface of the front member 30A. The width-wide welding plane 37b and the width-narrow welding plane 37a are on the same plane.

Similarly, as shown in FIG. 12, the lower groove 34 of the rear member 30B forms a lower elongated protrusion 37 in/on the inner surface of the rear member 30B. In the rear member 30B, a part except an upper edge part and a lower edge part of the lower elongated protrusion 37 forms/constitutes a width-narrow welding plane 37a and a width-wide welding plane 37b, as in the similar manner described above. In the rear member 30B, each of the width-narrow welding plane 37a and the width-wide welding plane 37b is a plane orthogonal to the front-rear direction. The width-wide welding plane 37b and the width-narrow welding plane 37a are on the same plane.

As shown in (B) of FIG. 11, and understood from FIGS. 7, 9, and 12, the rib forming concave parts 35 of the front member 30A forms a flow passage forming rib 38 in/on the inner surface of the front member 30A. A welding plane 38a is formed by the flow passage forming rib 38 (a part of the flow passage forming rib 38 except the upper edge part and the lower edge part thereof). An upper edge part of the inner surface of the flow passage forming rib 38 is formed by the upper inclined surface 35b, and is an upper inclined surface 38b which is substantially parallel to the upper inclined surface 35b. A lower edge part of the inner surface of the flow passage forming rib 38 is formed by the lower inclined surface 35c, and is a lower inclined surface 38c which is substantially parallel to the lower inclined surface 35c.

As shown FIGS. 7, 9, and 12, the rib forming concave parts 35 of the rear member 30B constitutes/forms a flow passage forming rib 38 in/on the inner surface of the rear member 30B, similarly to the rib forming concave parts 35 of the front member 30A.

The welding plane 38a of the front member 30A is a plane orthogonal to the front-rear direction, and is on the same plane as "the width-narrow welding plane 36a, the width-wide welding plane 36b, the width-narrow welding plane 37a, and the width-wide welding plane 37b" of the front member 30A.

The welding plane 38a of the rear member 30B is a plane orthogonal to the front-rear direction, and is on the same plane as "the width-narrow welding plane 36a, the width-wide welding plane 36b, the width-narrow welding plane 37a, and the width-wide welding plane 37b" of the rear member 30B.

As shown in FIGS. 7 and 9, an inner surface concave part 39 is formed in each of the front member 30A and the rear member 30B. The inner surface concave part 39 is a part surrounded by the upper elongated protrusion 36, the lower elongated protrusion 37, and the flow passage forming rib 38, in each of the front member 30A and the rear member 30B. A bottom surface of the inner surface concave part 39 is on (forms) a plane which is apart by a predetermined distance toward an outer side from the plane on which "the width-narrow welding plane 36a, the width-wide welding plane 36b, the width-narrow welding plane 37a, the width-wide welding plane 37b, and the welding plane 38a" are present.

As shown in FIG. 7, a first connecting concave part 39a is formed at the right edge part in the inner surface concave part 39 of each of the front member 30A and the rear member 30B. The first connecting concave part 39a is formed between the right edge part of the upper elongated protrusion 36 and the width-wide welding plane 37b.

As shown in FIG. 9, a second connecting concave part 39b is formed at the left edge part in the inner surface concave part 39 of each of the front member 30A and the rear member 30B. The second connecting concave part 39b is formed between the left edge part of the lower elongated protrusion 37 and the width-wide welding plane 36b.

As shown in FIGS. 7, and 9 (and further, refer to FIG. 12), a lower flow passage forming concave part 39c is formed at the lower part of the inner surface concave part 39 except the first connecting concave part 39a and the second connecting concave part 39b. The lower flow passage forming concave part 39c is located immediately below each of the flow passage forming ribs 38 so as to extend linearly in the left-right direction.

As shown in FIGS. 7, and 9 (and further, refer to FIG. 12), an upper flow passage forming concave part 39d is formed at the upper part of the inner surface concave part 39 except the first connecting concave part 39a and the second connecting concave part 39b. The upper flow passage forming concave part 39d is located immediately above each of the flow passage forming ribs 38 so as to extend linearly in the left-right direction.

As shown in FIG. 12, the inner surface concave part 39 has a plurality of upper-lower (vertical) direction flow passage forming concave parts 39e between the flow passage forming ribs 38 adjacent to each other. Each of the concave parts 39e extends in the upper-lower direction. In addition, the inner surface concave part 39 has the upper-lower direction flow passage forming concave part 39e, which extends in the upper-lower direction, between the rightmost flow passage forming rib 38 and the width-wide welding plane 37b. Similarly, the inner surface concave part 39 has the upper-lower direction flow passage forming concave part 39e, which extends in the upper-lower direction, between the leftmost flow passage forming rib 38 and the width-wide welding plane 36b.

The front member 30A and the rear member 30B are fixed to each other by laser welding between the width-narrow welding planes 36a of them, between the width-wide welding planes 36b of them, between the width-narrow welding planes 37a of them, between the width-wide welding planes 37b of them, and between the welding planes 38a of them. The laser welding is performed while the corresponding planes are in contacted with each other. In FIG. 12, hatched areas correspond to the parts to which the laser welding is applied. The elongated member 30 is manufactured through this laser welding.

Figure 8:
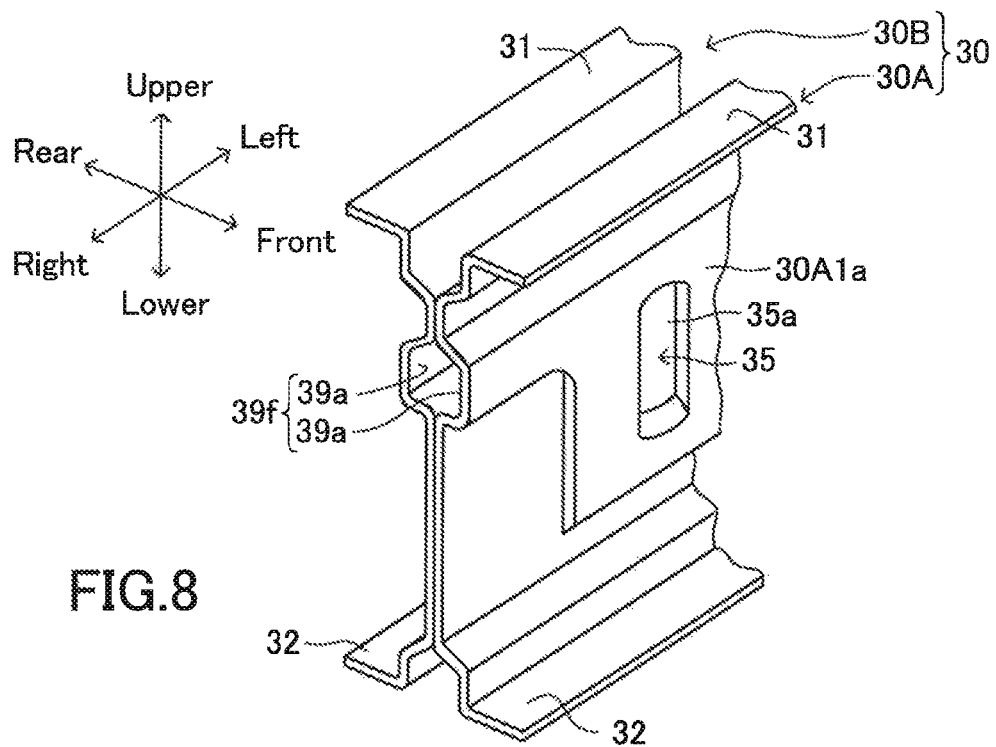
FIG. 8 is a perspective view of a right end part of the elongated member shown in FIG. 2.
Figure 10:
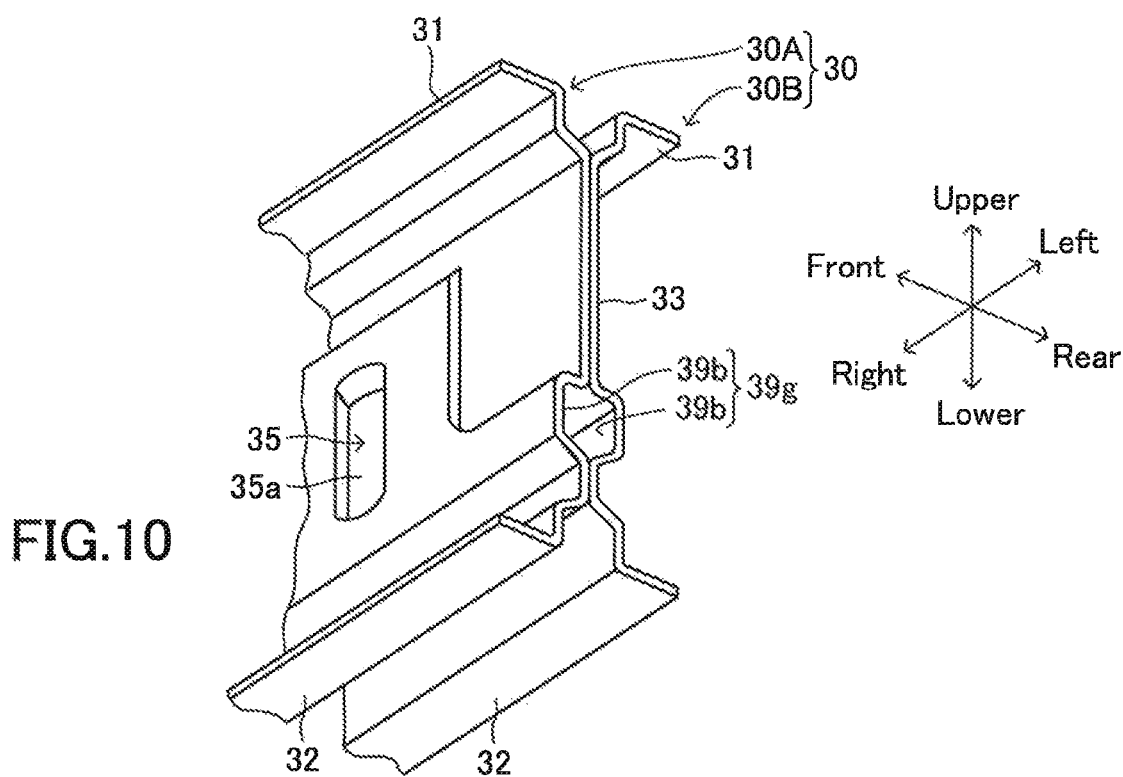
FIG. 10 is a perspective view of a left end part of the elongated member shown in FIG. 2.

Consequently, as shown in FIGS. 8 and 10, the upper restraining part 31 of the front member 30A and the upper restraining part 31 of the rear member 30B are positioned at the same height as each other (i.e., they are on the same upper plane), and the lower restraining part 32 of the front member 30A and the lower restraining part 32 of the rear member 30B are positioned at the same height as each other (i.e., they are on the same lower plane).

Furthermore, as shown in FIG. 8, a position of the right edge surface of the front member 30A coincides with a position of the right edge surface of the rear member 30B, and a first connection opening 39f is formed by the first connecting concave part 39a of the front member 30A and the first connecting concave part 39a of the rear member 30B.

Similarly, as shown in FIG. 10, a position of the left edge surface of the front member 30A coincides with a position of the left edge surface of the rear member 30B, and a second connection opening 39g is formed by the second connecting concave part 39b of the front member 30A and the second connecting concave part 39b of the rear member 30B.

Figure 13B:
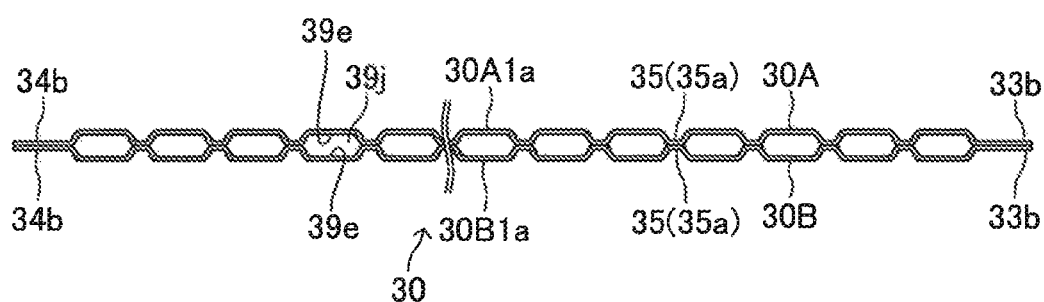
FIG. 13B is a cross-sectional view taken along the 3-3 line indicated in FIG. 13A.
Figure 14:
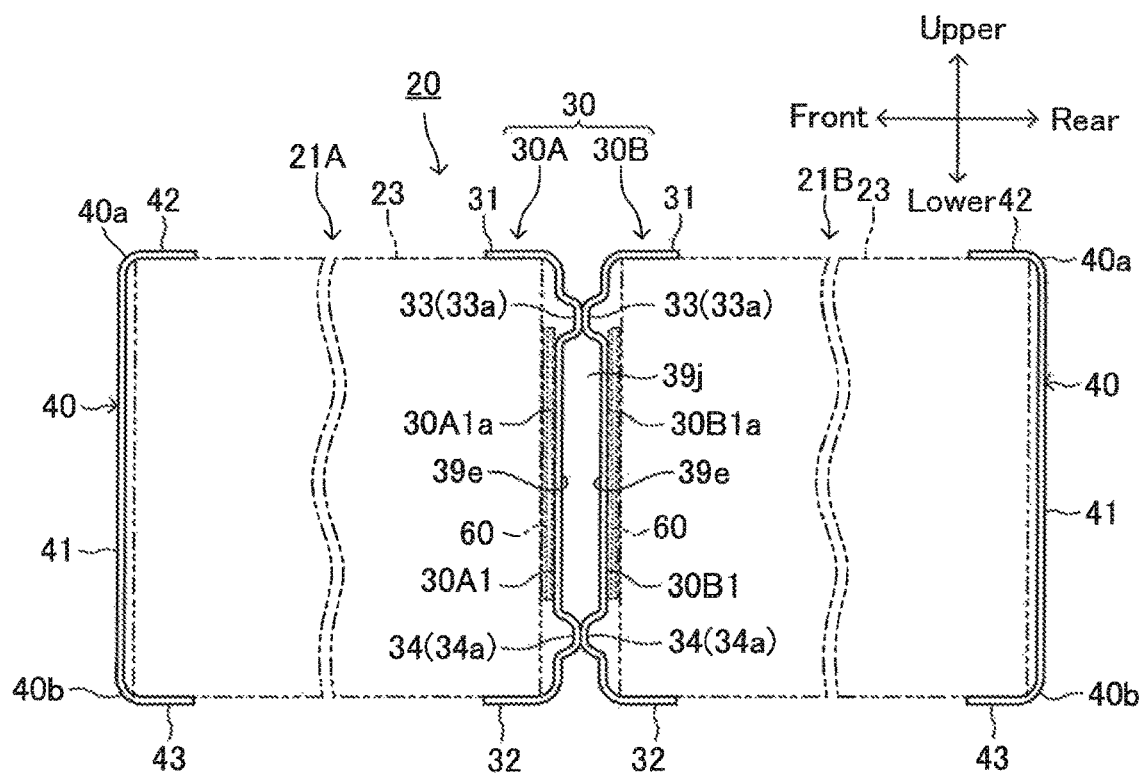
FIG. 14 is a cross-sectional view taken along the 4-4 line indicated in FIG. 13A.

Furthermore, as shown in FIG. 13B which is an end view of the elongated member 30 cut by a plane along 3-3 line shown in FIG. 13A, and as shown in FIG. 14 which is an end view of the elongated member 30 cut by a plane along 4-4 line shown in FIG. 13A, a plurality of upper-lower direction flow passages 39j are formed by the upper-lower direction flow passage forming concave parts 39e of the front member 30A and the upper-lower direction flow passage forming concave parts 39e of the rear member 30B.

Figure 15:
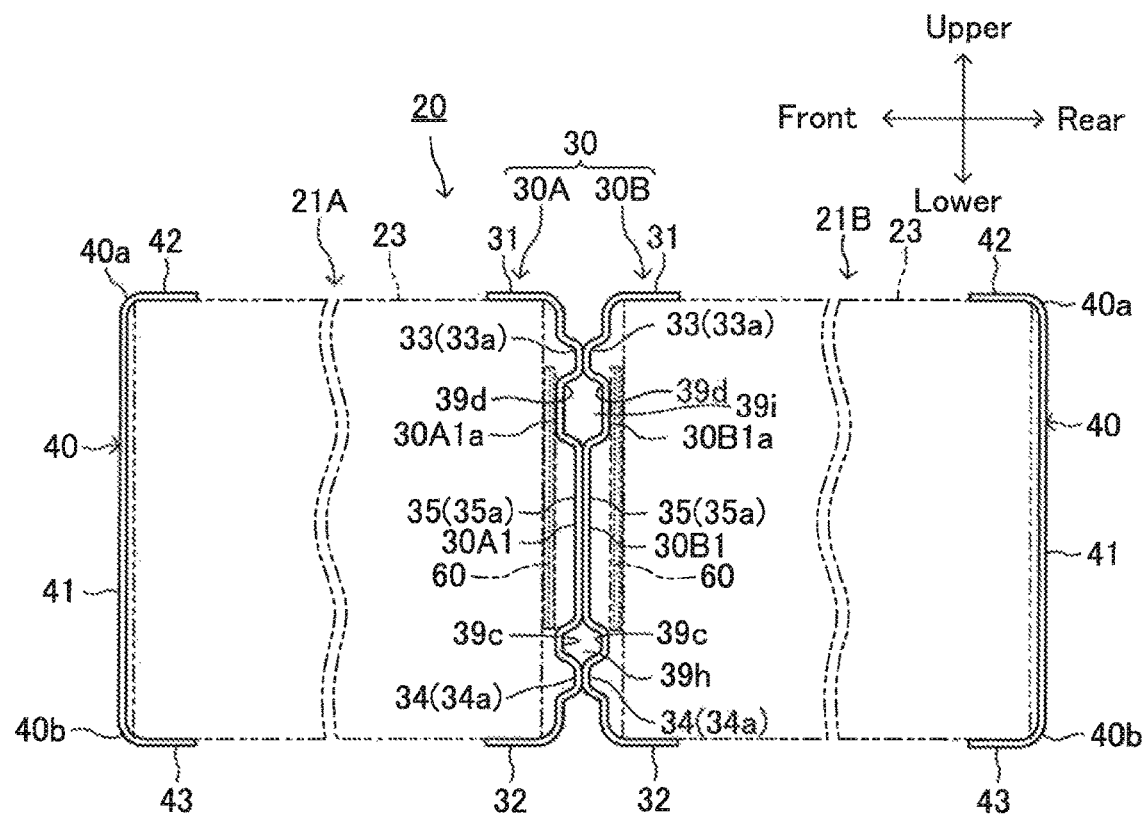
FIG. 15 is a cross-sectional view taken along the 5-5 line indicated in FIG. 13A.

In addition, as shown in FIG. 15 which is an end view of the elongated member 30 cut by a plane along 5-5 line shown in FIG. 13A, an upper flow passage 39i is formed by the upper flow passage forming concave part 39d of the front member 30A and the upper flow passage forming concave part 39d of the rear member 30B.

Figure 16:
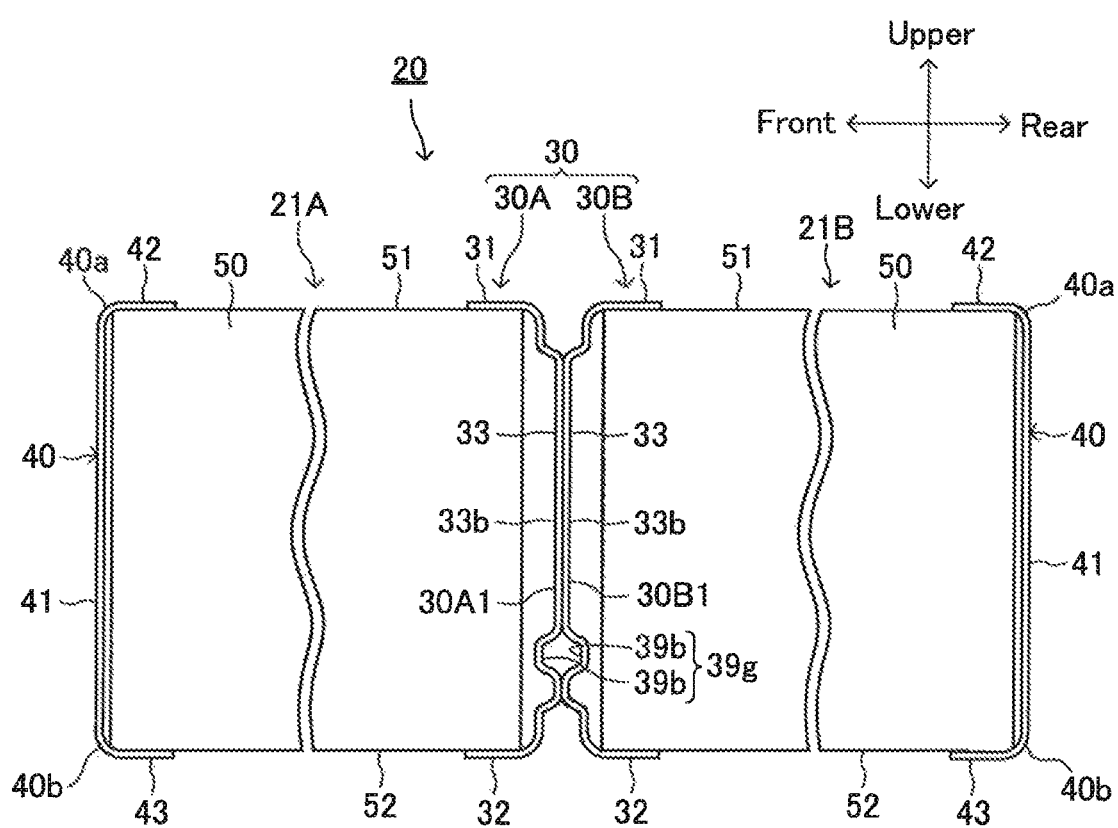
FIG. 16 is a side view of the battery module shown in FIG. 1.

As shown in FIGS. 14 to 16, a part of the front member 30A except "the upper restraining part 31 and the lower restraining part 32" of the front member 30A constitutes a temperature regulating part 30A1, and a part of the rear member 30B except "the upper restraining part 31 and the lower restraining part 32" of the rear member 30B constitutes a temperature regulating part 30B1. In other words, the front member 30A comprises the upper restraining part 31, the lower restraining part 32, and the temperature regulating part 30A1. The rear member 30B comprises the upper restraining part 31, the lower restraining part 32, and the temperature regulating part 30B1.

As shown in FIGS. 14 and 15, an outer surface of the front member 30A between the upper groove 33 and the lower groove 34, except the rib forming concave parts 35, constitutes a heat exchange plane part 30A1a which is orthogonal to the front-rear direction. Similarly, as shown in FIGS. 14 and 15, an outer surface of the rear member 30B between the upper groove 33 and the lower groove 34, except the rib forming concave parts 35, constitutes a heat exchange plane part 30B1a which is orthogonal to the front-rear direction.

As shown in FIG. 4, each of the restraining members 40 (that is, each of the front restraining member 40 and the rear restraining member 40) is made of an iron plate and a single piece made through press forming. The front restraining member 40 and the rear restraining member 40 (i.e., a pair of front and rear restraining members 40) are symmetrical with each other with respect to a line along the left-right direction (in front-rear direction). A dimension (length) of the restraining member 40 in the left-right direction is the same as that of the elongated member 30. Each of the restraining members 40 includes a base plate part 41, an plate-like upper restraining part 42, and a plate-like lower restraining part 43. The base plate part 41 is a plate-like part whose surface is orthogonal to the front-rear direction. The upper restraining part 42 is provided at an upper edge part of the base plate part 41 and extends in the left-right direction so as to be present in the substantially horizontal plane. A corner part 40a is formed by the base plate part 41 and the upper restraining part 42. The lower restraining part 43 is provided at a lower edge part of the base plate part 41 and extends in the left-right direction so as to be present in the substantially horizontal plane. A corner part 40b is formed by the base plate part 41 and the lower restraining part 43. A distance in the upper-lower direction between a lower surface of the upper restraining part 42 and an upper surface of the lower restraining part 43 is substantially the same as a distance in the upper-lower direction between a lower surface of the upper restraining part 31 and an upper surface of the lower restraining part 32. The upper restraining part 31, the lower restraining part 32, the upper restraining part 42, and the lower restraining part 43 have substantially the same length in the front-rear direction as each other (for example, each of those length is around 1/10 of the length of the battery cell 22 in the front-rear direction).

As shown in FIG. 4, the battery module 20 includes four of end members 50. More specifically, each of the first battery stack 21A and the second battery stack 21b is positioned between a pair of the end members 50.

The end member 50 is made of metal, and its overall shape is a rectangular parallelepiped. Therefore, an upper surface 51 of the end member 50 and a lower surface 52 of the end member 50 are parallel to each other, and are flat. The front-rear dimension, the upper-lower direction (vertical dimension), and the left-right dimension (thickness) of the end member 50 are substantially the same as those of the cover 23, respectively. The end member 50 is a solid member, and the rigidity of the end member 50 with respect to the external force in the thickness direction thereof is higher than that of the case 22a (battery cell 22). Note, however, that the left-right dimension of the end member 50 may be different from that of the case 22a. Furthermore, the end member 50 may be a hollow member.

As shown in FIG. 5, the battery modules 20 is configured by assembling the first battery stack 21A, the second battery stack 21B, the elongated member 30, a pair of the restraining members 40, four of the end members 50, and a pair of the insulation heat transfer sheets 60.

More specifically, a rear end part of "the battery cell 22 to which the cover 23 is attached" of the first battery stack 21A is inserted between the upper restraining part 31 of the front member 30A and the lower restraining part 32 of the front member 30A. A front end part of "the battery cell 22 to which the cover 23 is attached" of the first battery stack 21A is inserted between the upper restraining part 42 of the front restraining member 40 and the lower restraining part 43 of the front restraining member 40.

Similarly, a front end part of "the battery cell 22 to which the cover 23 is attached" of the second battery stack 21B is inserted between the upper restraining part 31 of the rear member 30B and the lower restraining part 32 of the rear member 30B. A rear end part of "the battery cell 22 to which the cover 23 is attached" of the second battery stack 21B is inserted between the upper restraining part 42 of the rear restraining member 40 and the lower restraining part 43 of the rear restraining member 40.

A left end of the elongated member 30 and left ends of the restraining members 40 (the front restraining members 40 and the rear restraining members 40) are positioned leftward of left ends of "the first battery stack 21A and the second battery stack 21B". A right end of the elongated member 30 and right ends of the restraining members 40 (the front restraining members 40 and the rear restraining members 40) are positioned rightward of right ends of "the first battery stack 21A and the second battery stack 21B".

Furthermore, as shown in FIGS. 14 and 15, a rear surface of the insulation heat transfer sheet 60 at the front side (i.e., the front insulation heat transfer sheet 60) are made to contact the heat exchange plane part 30A1a of the front member 30A. Furthermore, an upper corner of the front end of each of the covers 23 of the first battery stack 21A is made to contact an inner surface of the corner part 40a of the front restraining member 40, and a lower corner of the front end of each of the covers 23 of the first battery stack 21A is made to contact an inner surface of the corner part 40b of the front restraining member 40.

Similarly, a front surface of the insulation heat transfer sheet 60 at the rear side (i.e., the rear insulation heat transfer sheet 60) are made to contact the heat exchange plane part 30B1a of the rear member 30B. Furthermore, an upper corner of the rear end of each of the covers 23 of the second battery stack 21B is made to contact an inner surface of the corner part 40a of the rear restraining member 40, and a lower corner of the rear end of each of the covers 23 of the second battery stack 21B is made to contact an inner surface of the corner part 40b of the rear restraining member 40.

In other words, the (front and rear) insulation heat transfer sheets 60, the elongated member 30, and the (front and rear) restraining members 40 restrains/regulates a relative movement of the first battery stack 21A and the second battery stack 21B in the front-rear direction with respect the elongated member 30 and the (front and rear) restraining members 40.

Furthermore, as described above, the distance (the upper-lower direction length) between the lower surface of the upper restraining part 31 and the upper surface of the lower restraining part 32 is slightly longer than the dimension in the upper-lower direction of the cover 23 attached to the case 22a. Therefore, a minute gap is formed/provided between the upper restraining part 31 and the cover 23 and/or between the lower restraining part 32 and the cover 23. Also, the distance (the upper-lower direction length) between the lower surface of the upper restraining part 42 and the upper surface of the lower restraining part 43 is slightly longer than the dimension in the upper-lower direction of the cover 23 attached to the case 22a. Therefore, a minute gap is formed/ provided between the upper restraining part 42 and the cover 23 and/or between the lower restraining part 43 and the cover 23. It should be noted, however, that the lower surface of the cover 23 may be placed/mounted on the upper surface of the lower restraining part 32. Similarly, the lower surface of the cover 23 may be placed/mounted on the upper surface of the lower restraining part 43.

As shown in FIG. 4, one of the end members 50 is made to contact a left surface of the cover 23 attached to the leftmost battery cell 22 of the first battery stack 21A, and another of the end members 50 is made to contact a right surface of the cover 23 attached to the rightmost battery cell 22 of the first battery stack 21A. As shown in FIGS. 4, and 5, the rear end of the left side end member 50 contacting the first battery stack 21A is inserted between the upper restraining part 31 and the lower restraining part 32, both at the left end part of the front member 30A. The front end of the left side end member 50 contacting the first battery stack 21A is inserted between the upper restraining part 42 and the lower restraining part 43, both at the left end part of the front restraining member 40. Similarly, the rear end of the right side end member 50 contacting the first battery stack 21A is inserted between the upper restraining part 31 and the lower restraining part 32, both at the right end part of the front member 30A. The front end of the right side end member 50 contacting the first battery stack 21A is inserted between the upper restraining part 42 and the lower restraining part 43, both at the right end part of the front restraining member 40.

The following parts regarding first battery stack 21A are connected/fixed to each other through laser welding.

"Rear part of the upper surface 51 of the right end member 50 attached to the first battery stack 21A" and "the upper restraining part 31 of the front member 30A".

"Rear part of the upper surface 51 of the left end member 50 attached to the first battery stack 21A" and "the upper restraining part 31 of the front member 30A".

"Front part of the upper surface 51 of the right end member 50 attached to the first battery stack 21A" and "the upper restraining part 42 of the front restraining member 40".

"Front part of the upper surface 51 of the left end member 50 attached to the first battery stack 21A" and "the upper restraining part 42 of the front restraining member 40".

"Rear part of the lower surface 52 of the right end member 50 attached to the first battery stack 21A" and "the lower restraining part 32 of the front member 30A".

"Rear part of the lower surface 52 of the left end member 50 attached to the first battery stack 21A" and "the lower restraining part 32 of the front member 30A".

"Front part of the lower surface 52 of the right end member 50 attached to the first battery stack 21A" and "the lower restraining part 43 of the front restraining member 40".

"Front part of the lower surface 52 of the left end member 50 attached to the first battery stack 21A" and "the lower restraining part 43 of the front restraining member 40".

Similarly, one of the end members 50 is made to contact a left surface of the cover 23 attached to the leftmost battery cell 22 of the second battery stack 21B, and another of the end members 50 is made to contact a right surface of the cover 23 attached to the rightmost battery cell 22 of the second battery stack 21B. As shown in FIGS. 4, and 5, the front end of the left side end member 50 contacting the second battery stack 21B is inserted between the upper restraining part 31 and the lower restraining part 32, both at the left end part of the rear member 30B. The rear end of the left side end member 50 contacting the second battery stack 21B is inserted between the upper restraining part 42 and the lower restraining part 43, both at the left end part of the rear restraining member 40. Similarly, the front end of the right side end member 50 contacting the second battery stack 21B is inserted between the upper restraining part 31 and the lower restraining part 32, both at the right end part of the rear member 30B. The rear end of the right side end member 50 contacting the second battery stack 21B is inserted between the upper restraining part 42 and the lower restraining part 43, both at the right end part of the rear restraining member 40.

The following parts regarding second battery stack 21B are connected/fixed to each other through laser welding.

"Front part of the upper surface 51 of the right end member 50 attached to the second battery stack 21B" and "the upper restraining part 31 of the rear member 30B".

"Front part of the upper surface 51 of the left end member 50 attached to the second battery stack 21B" and "the upper restraining part 31 of the rear member 30B".

"Rear part of the upper surface 51 of the right end member 50 attached to the second battery stack 21B" and "the upper restraining part 42 of the rear restraining member 40".

"Rear part of the upper surface 51 of the left end member 50 attached to the second battery stack 21B" and "the upper restraining part 42 of the rear restraining member 40".

"Front part of the lower surface 52 of the right end member 50 attached to the second battery stack 21B" and "the lower restraining part 32 of the rear member 30B".

"Front part of the lower surface 52 of the left end member 50 attached to the second battery stack 21B" and "the lower restraining part 32 of the rear member 30B".

"Rear part of the lower surface 52 of the right end member attached to the second battery stack 21B" and "the lower restraining part 43 of the rear restraining member 40".

"Rear part of the lower surface 52 of the left end member attached to the second battery stack 21B" and "the lower restraining part 43 of the rear restraining member 40".

In this manner, when each of the end members 50, each sandwiching either one of the first battery stack 21A and the second battery stack 21B, is fixed between the elongated member 30 and the respective restraining member 40, a contacting state between the covers 23 adjacent to each other is secured. Furthermore, a contacting state between the front insulation heat transfer sheet 60 and the heat exchange plane part 30A1a of the front member 30A is secured through the end members located on the front side, and a contacting state between the rear insulation heat transfer sheet 60 and the heat exchange plane part 30B1a of the rear member 30B is also secured through the end members located on the rear side.

The fluid circulation unit 80 shown in FIG. 1 is connected to an integrated/united device of thus assembled "the first battery stack 21A, the second battery stack 21B, the elongated member 30, the restraining members 40, and the end members 50". The fluid circulation unit 80 comprises connection attachments 81, connection attachments 82, a liquid delivery tube/pipe 83, a gas return tube/pipe 84, and a heat exchange device 85.

As shown in FIG. 4, the connection attachment 81 includes a tube connection part 81a having a rectangular parallelepiped shape, and a connection protrusion (projected part) 81b protruding from the tube connection part 81a. In the connection attachment 81a and the connection protrusion 81b, an unillustrated fluid through hole that penetrates the tube connection part 81a and the connection protrusion 81b is formed. As understood from FIG. 1, the unillustrated fluid through hole in the tube connection part 81a is connected/communicated with the liquid delivery tube 83.

Similarly, the connection attachment 82 shown in FIG. 4 includes a tube connection part 82a having a rectangular parallelepiped shape, and a connection protrusion (projected part) 81b protruding from the tube connection part 82a. In the connection attachment 82a and the connection protrusion 82b, an unillustrated fluid through hole that penetrates the tube connection part 82a and the connection protrusion 82b is formed. As understood from FIG. 1, the unillustrated fluid through hole in the tube connection part 82a is connected/communicated with the gas return tube 84.

As shown in FIG. 12, the connection attachments 81 is connected to the elongated member 30 by fitting the connection protrusion 81b into the second connection opening 39g. Similarly, the connection attachments 82 is connected to the elongated member 30 by fitting the connection protrusion 82b into the first connection opening 39f. Accordingly, the fluid through hole of the connection protrusion 81b is communicated with the fluid through hole of the connection protrusion 82b via the inner space of the elongated member 30 (that is, through the second connection opening 39g, the lower flow passage 39h, the upper-lower direction flow passages 39j, the upper flow passage 39i, and the first connection opening 39f).

Therefore, as understood from FIG. 1, the liquid delivery tube 83, each of the connection attachments 81, each of the inner space of the elongated members 30, each of the connection attachments 82, the gas return tube 84, and the heat exchange device 85 constitute a closed refrigerant (cooling medium) circulation path/passage. As shown in FIG. 12, a predetermined amount of the refrigerant (cooling medium) RF is stored in the refrigerant circulation path. The refrigerant RF becomes a liquid phase (liquid) or a gas phase (gas) depending on its temperature.

As shown in FIG. 1, "the battery device 10 comprising four of the battery modules 20 and a part of the fluid circulation unit 80" is stored in the storage case 90 made of metal. The storage case 90 includes a box-shaped case body 91 fixed to a vehicle body of the vehicle, and a lid part 92. An upper part of the case body 91 is opened. The lid part 92 detachably closes the opened upper part of the case body 91. The battery device 10 is fixed to the case body 91 thorough un illustrated fixing means. The heat exchange device 85 is fixed to the vehicle body so as to be located outside the storage case 90, above the connection attachments 81, and above the connection attachments 82. The heat exchange device 85 is exposed to the outside of the vehicle, and is capable of exchanging heat with the outside air of the vehicle. The case body 91 has a plurality of through holes. Each of the liquid delivery tube 83 and the gas return tube 84 goes through each of those through holes of the case body 91.

The operation of the battery device 10 will next be described.

When each of the battery cells 22 of each of the battery modules 20 of the battery device 10 performs a charging operation or a discharging operation, each of the battery cells 22 generates heat that raises the temperature of each of the battery cells 22. Then, each of the battery cells 22 is cooled by the refrigerant RF flowing through the refrigerant circulation path. Operation of cooling the cells 22 using the refrigerant RF and the fluid circulation unit 80, and the like, is known as disclosed in Japanese Patent No. 5942943. Therefore, this cooling operation will not be described in detail in this specification, but will be briefly described below.

As shown in FIG. 12, the liquid-phase refrigerant RF is supplied to the second connection opening 39g, the lower flow passage 39h, and a lower part of each of the upper-lower direction flow passages 39j, via the liquid delivery tube 83. In each of the battery modules 20, the heat generated by the battery cells 22 is transferred to the refrigerant RF in the elongated member 30 via the insulation heat transfer sheets 60, the heat exchange plane part 30A1a, and the heat exchange plane part 30B1a. Thus, the refrigerant RF in the elongated member 30 is heated by the heat generated by the battery cells 22, and in turn, the battery cells 22 from which heat is removed by the refrigerant RF are cooled. Therefore, since the temperature of each of the battery cells 22 is maintained within a predetermined appropriate temperature range (i.e. the temperature is regulated), each of the battery cells 22 can efficiently perform the charging operation and the discharging operation.

The heated refrigerant RF evaporates into a gas (the gas phase) and rises (flows) through the upper-lower direction flow passages 39j to the upper flow passage 39i from the lower flow passage 39h. Since the gas-phase refrigerant RF has a high pressure, the gas-phase refrigerant RF causes each of the inner spaces of the elongated members 30 to have a high pressure, e.g., 2 MPa. The gas-phase refrigerant RF flows to the heat exchange device 85 through the first connection opening 39f, the fluid through hole of the connection attachments 82, and the gas return tube 84. When the gas-phase refrigerant RF reaches the heat exchange device 85, the gas-phase refrigerant RF is cooled by the heat exchange device 85 which is cooled by the outside air having a temperature lower than that of the gas-phase refrigerant RF. This causes the temperature of the refrigerant RF inside the heat exchange device 85 to drop to the same temperature as the outside air temperature, and therefore, the gas-phase refrigerant RF is condensed to change into the liquid phase refrigerant RF. The liquid phase refrigerant RF flows from the heat exchange device 85 to the liquid delivery tube 83, and flows by gravity into the second connection opening 39g and the lower flow passage 39h of each of the elongated members 30 via each of the connection attachments 81. In this manner, the refrigerant RF in the refrigerant circulation path circulates in the refrigerant circulation path by utilizing the temperature difference between the battery cell 22 and the outside air, and utilizing the height difference between each of the connection attachments 82 and the heat exchange device 85 as well as the height difference between each of the connection attachments 81 and the heat exchange device 85.

As described above, in the present embodiment, the elongated member 30 integrally includes both of the part (the temperature regulating part 30A1 and the temperature regulating part 30B1) to cool the battery cells 22 and the part (the upper restraining part 31 and the lower restraining part 32) to hold the end members 50. Therefore, as compared with a device which has the part to cool the battery cells 22 and the part to hold the end members 50 separately, the parts count (the number of parts included in the battery device 10) is smaller and the manufacturing cost of the battery device 10 is lowered.

Furthermore, the front member 30A and the rear member 30B, for constituting the elongated member 30, are made of pieces made through press forming. Therefore, as compared with a case where the elongated member is cast in metal, the manufacturing cost for the elongated member 30 can be lowered.

Incidentally, it is necessary to make the pressure of the refrigerant RF high in order to change the refrigerant RF between the liquid and the gas depending on the temperature of the refrigerant RF. Thus, the pressure in the inner space of the elongated member 30 through which the refrigerant RF flows becomes high (e.g., 2 MPa) when the battery cells perform the charging operation and/or the discharging operation. In this regard, the elongated member 30 needs to be resistant to the high pressure. For this reason, the elongated member 30 has high mechanical strength, since the front member 30A and the rear member 30B has a plurality of the flow passage forming ribs 38. In other words, the elongated member 30 is resistant to the high pressure. Accordingly, it is unlikely that the elongated member 30 deforms when the battery cells perform the charging operation and/or the discharging operation.

It should be noted that the front member 30A and the rear member 30B may be made of aluminium. However, if they are made of aluminium, a larger number of the flow passage forming ribs 38 may be necessary than the elongated member 30 made of iron, in order to let the mechanical strength of the elongated member 30 made of aluminium be the same as that of the elongated member 30 made of iron. In the elongated member 30 made of aluminium having a larger number of flow passage forming ribs 38, a distance between the flow passage forming ribs 38 adjacent to each other, a distance between the rightmost flow passage forming rib 38 and the width-wide welding plane 37b, and a distance between the leftmost flow passage forming rib 38 and the width-wide welding plane 36b need to be smaller than those of the elongated member 30 made of iron. Thus, the elongated member 30 made of aluminium is harder to be manufactured than the elongated member 30 made of iron. Meanwhile, as in the present embodiment, if the elongated member 30 is made of iron, the mechanical strength can be high with the fewer number of the flow passage forming ribs 38. Thus, in the elongated member 30 made of iron, a distance between the flow passage forming ribs 38 adjacent to each other, a distance between the rightmost flow passage forming rib 38 and the width-wide welding plane 37b, and a distance between the leftmost flow passage forming rib 38 and the width-wide welding plane 36b can be wide. Consequently, in the present embodiment, the front member 30A and the rear member 30B can be easily made through press forming. Note, however, the elongated member 30 may be made of metal including aluminium or alloy, as long as its mechanical strength is secured.

In the present embodiment, the first battery stack 21A, the second battery stack 21B, the elongated member 30 are arranged in the horizontal direction. In other words, the elongated member 30 is positioned neither above nor below the first battery stack 21A and the second battery stack 21B. Accordingly, the vertical dimension of the battery module 20 can be smaller.

In addition, the upper restraining part 31 of the elongated member 30 is positioned immediately above each of the covers (the battery cells 22) and the lower restraining part 32 of the elongated member 30 is positioned immediately below each of the covers (the battery cells 22). Furthermore, the upper restraining part 31 contacts the each of the covers 23, or there is a minute gap between the upper restraining part 31 and the each of the covers 23. Similarly, the lower restraining part 32 contacts the each of the covers 23, or there is a minute gap between the lower restraining part 32 and the each of the covers 23. Accordingly, when the vehicle runs, the upper restraining part 31 and the lower restraining part 32 can prevent the each of the battery cells 22 from greatly moving in the upper-lower direction (vibrating vertically) with respect to the elongated member 30.

Since the mechanical strength of the elongated member 30 is high, the holding/supporting strength for the upper restraining part 31 and the lower restraining part 32 by the temperature regulating part 30A1 and the temperature regulating part 30B1 is also high. Therefore, the upper restraining part 31 and the lower restraining part 32 can hold the end members 50 firmly.

The embodiment of the present invention has been described, however, the present invention should not limited to the embodiment, and various modifications can be made without departing from the purpose of the present invention.

Figure 17:
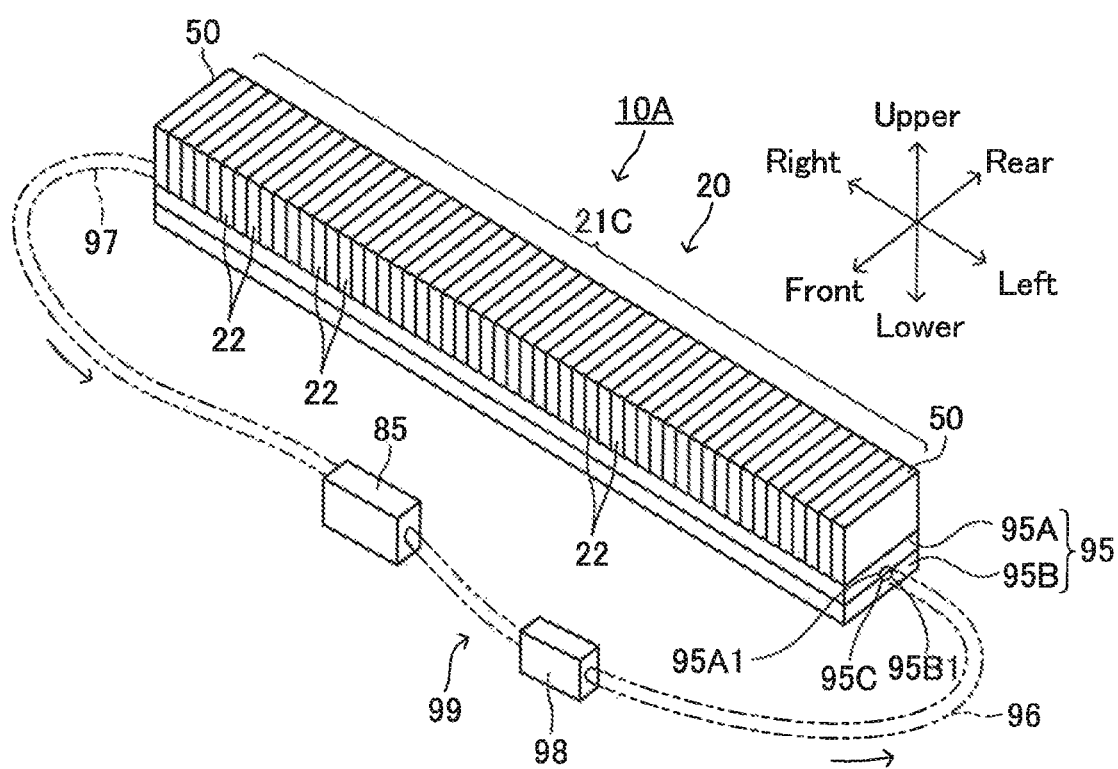
FIG. 17 is a perspective view of a battery device according to a first modification of the present invention.
Figure 18:
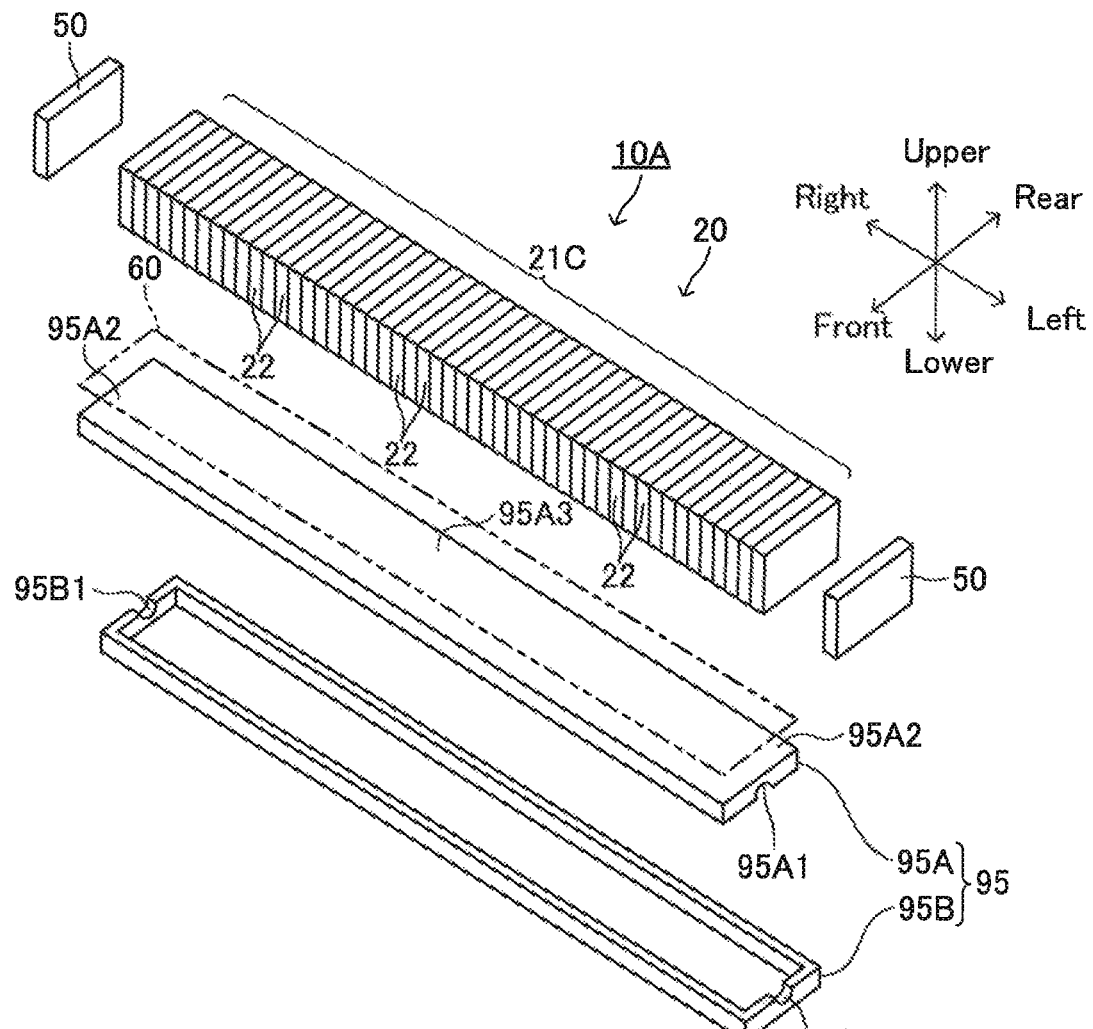
FIG. 18 is an exploded perspective view of the battery device shown in FIG. 17.

For example, a first modification shown in FIGS. 17, and 18 may be employed when implementing the present invention. The battery device 10A in the first modification includes four of the battery modules 20. Note, however, FIGS. 16, and 17 show only one battery module 20. Each of the battery modules 20 includes a single battery stack 21C, a pair of the end members 50, and an elongated member 95. The battery stack 21C has the same configuration as the first battery stack 21A. In FIGS. 17, and 18, a cover 23 attached to each of battery cells 22 is not shown.

The elongated member 95 of the first modification includes an upper member 95A and a lower member 95B. Each of the upper member 95A and the lower member 95B is made of an iron plate and a single piece made through press forming. As shown in FIG. 18, the upper member 95A and the lower member 95B are symmetrical to each other with respect to a horizontal plane (symmetrical in the upper-lower direction). The upper member 95A has a rectangular parallelepiped whose longitudinal axis extends in the left-right direction. A lower surface of the upper member 95A is opened. The lower member 95B has a rectangular parallelepiped whose longitudinal axis extends in the left-right direction. An upper surface of the lower member 95B is opened. A semicircle concave part 95A1 is formed on/in a bottom surface of each of a left side wall and a right side wall of the upper member 95A. Note that the semicircle concave part 95A1 in the bottom surface of the right side wall of the upper member 95A is not shown. Similarly, a semicircle concave part 95B1 is formed on/in an upper surface of each of a left side wall and a right side wall of the lower member 95B. The upper member 95A and the lower member 95B are fixed/connected to each other through laser welding of a contacting part between the bottom surfaces of the side walls of the upper member 95A and the upper surfaces of the side walls of the lower member 95B (i.e., between facing surfaces thereof), so that the elongated member 95 shown in FIG. 17 is made. As shown in FIG. 17, a connection thorough hole 95C is formed at each of the left and right ends of the elongated member 95 by the semicircle concave part 95A1 and the semicircle concave part 95B1. The connection thorough hole 95C at the right end is not shown in FIG. 17.

As shown in FIG. 18, a left end part of an upper surface of the upper member 95A corresponds to an end member fixing part 95A2, and a right end part of the upper surface of the upper member 95A corresponds to another end member fixing part 95A2. A part of the upper surface of the upper member 95A other than the right and left end member fixing parts 95A2 corresponds to a heat exchange plane part 95A3. The battery stack 21C is placed/mounted on the insulation heat transfer sheet 60 which is placed on the elongated member 95. Bottom (under) surfaces of the covers attached to the battery cells 22 of the battery stack 21C are positioned directly above the heat exchange plane part 95A3 via the insulation heat transfer sheet 60. Each of the end members 50 is fixed to each of the left and right end member fixing parts 95A through laser welding in such a manner that the left and right end members 50 sandwich the battery stack 21C.

As shown in FIG. 17, one of ends of a water delivery tube 96 is connected to the left connection thorough hole 95C. One of ends of a water draining tube 97 is connected to the right connection thorough hole 95C. The other end of the water delivery tube 96 and the other end of the water draining tube 97 are connected to the heat exchange device 85. An electric pump 98 is provided in the water delivery tube 96 between the heat exchange device 85 and the left connection thorough hole 95C.

Although not shown, an integrated unit of the battery stack 21C, the end members 50, and the elongated member 95 are placed in the storage case 90. The water delivery tube 96 and the water draining tube 97 pass through unillustrated through holes of the storage case 90 so that the other end of the water delivery tube 96 and the other end of the water draining tube 97 are outside of the storage case 90. The heat exchange device 85 and the electric pump 98 are outside of the storage case 90. The heat exchange device 85 is fixed to the body of the vehicle so as to be exposed to the outside of the vehicle.

As shown in FIG. 17, the heat exchange device 85, an inner space of the elongated member 95, the water delivery tube 96, the water draining tube 97, and the electric pump 98 constitute a closed cooling water (refrigerant, cooling medium) circulation path 99. A predetermined amount of unillustrated cooling water is filled/stored in the cooling water circulation path 99. It should be noted that the elongated member 95 needs not be superior in pressure resistance since a pressure in the inner space of the elongated member 95 does not become high when the battery cells 22 perform the charging/discharging operation.

The operation of the battery device 10A will next be described.

When each of the battery cells 22 of the battery device 10A performs the charging operation or the discharging operation, an unillustrated control unit (controller) installed in the vehicle lets an unillustrated battery for accessories supply electric power to the electric pump 98 to drive the electric pump 98. This causes the cooling water to circulate in the cooling water circulation path 99 along a direction indicated by arrows shown in FIG. 17.

The heat generated by the battery cells 22 is transferred to the cooling water in the elongated member 95 via the covers 23, the insulation heat transfer sheet 60, and the heat exchange plane part 95A3. Thus, the cooling water in the elongated member 95 is heated by the heat generated by the battery cells 22, and in turn, the battery cells 22 from which heat is removed by the cooling water are cooled. Therefore, since the temperature of each of the battery cells 22 is maintained within a predetermined appropriate temperature range, each of the battery cells 22 can efficiently perform the charging operation and the discharging operation.

The cooling water heated in the elongated member 95 flows to the heat exchange device 85 through the water draining tube 97. Then, the cooling water is cooled by the heat exchange device 85 which is cooled by the outside air having a temperature lower than that of the cooling water. This causes the temperature of the cooling water inside the heat exchange device 85 to drop to the same temperature as the outside air temperature. The cooling water whose temperature is lowered flows from the heat exchange device 85 to the inner space of the elongated member 95 through the water delivery tube 96 owing to the driven electric pump 98.

The thus configured first modification also exhibits the same effect as that of the above embodiment.

Figure 19:
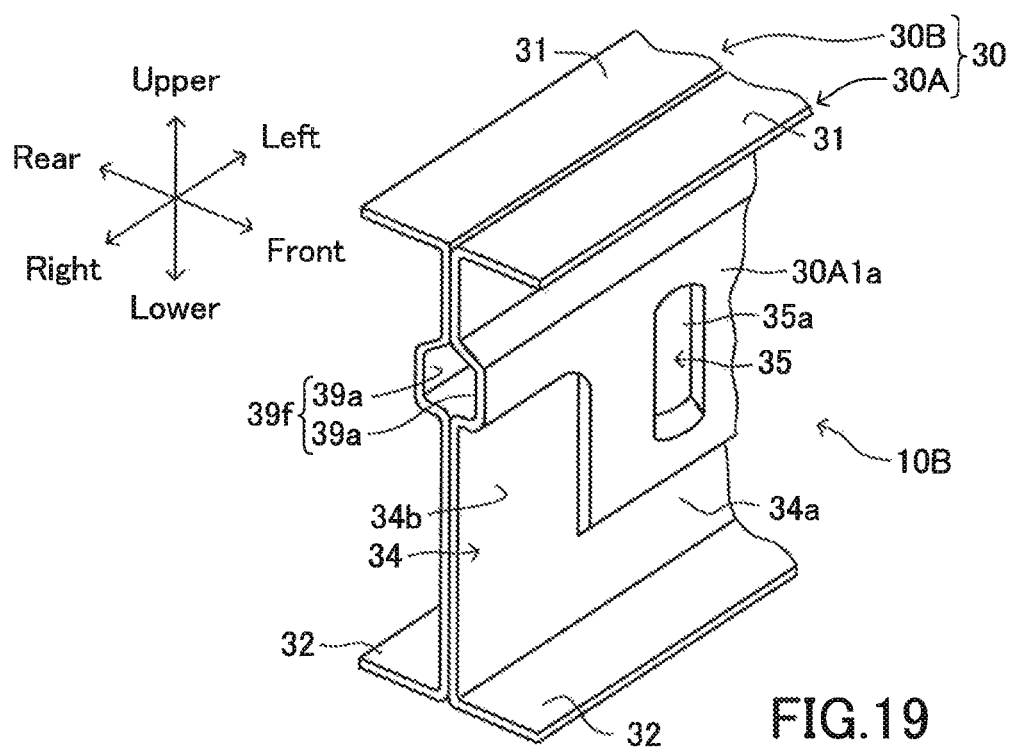
FIG. 19 is a perspective view of a battery device according to a second modification of the present invention, the view corresponding to the view shown in FIG. 8.
Figure 20:
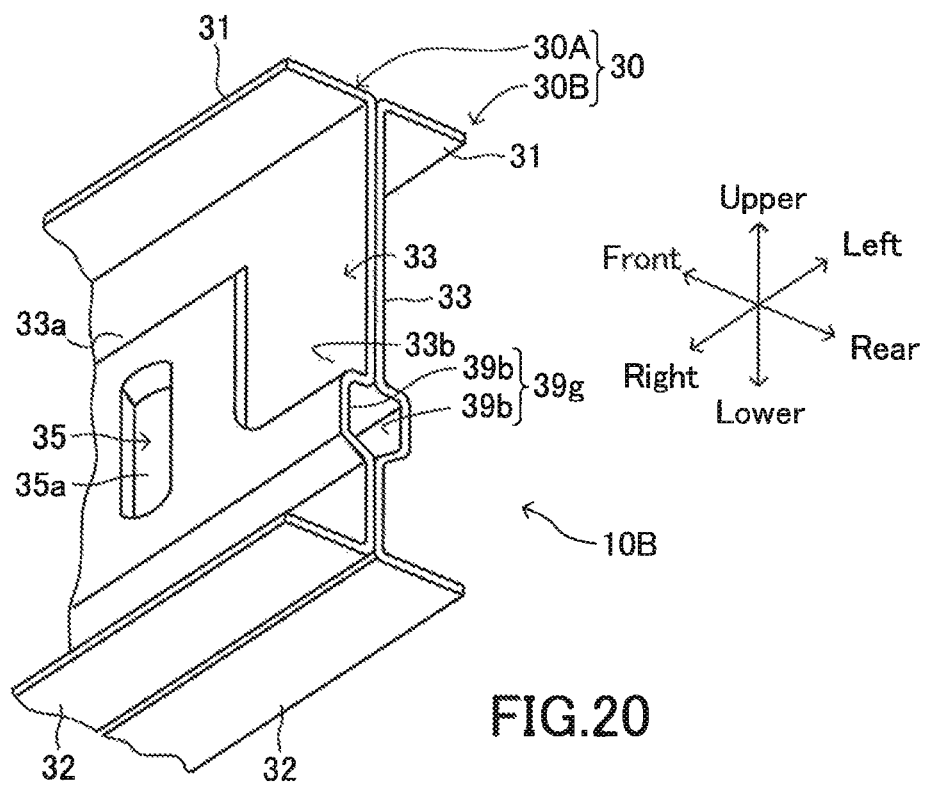
FIG. 20 is a perspective view of a battery device according to the second modification of the present invention, the view corresponding to the view shown in FIG. 10.
Figure 21:
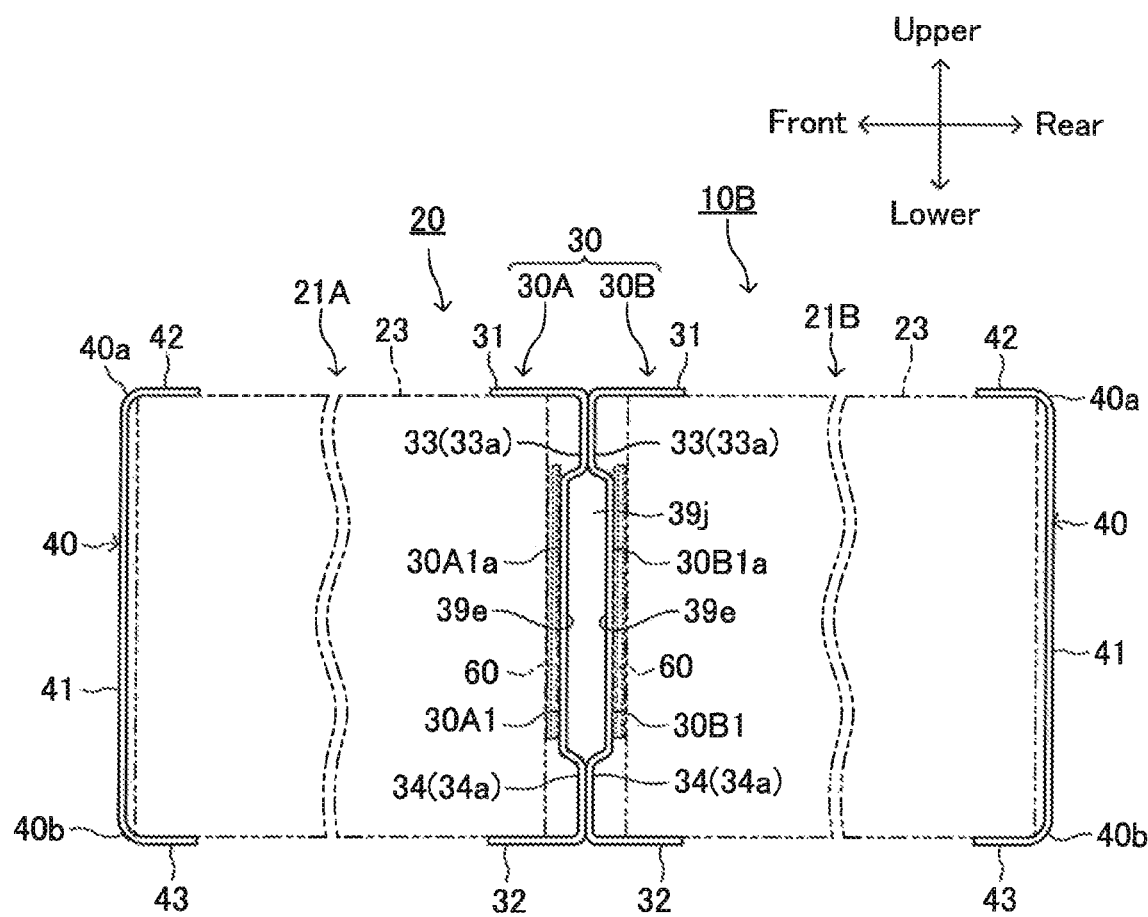
FIG. 21 is a perspective view of a battery device according to the second modification of the present invention, the view corresponding to the view shown in FIG. 14.
Figure 22:
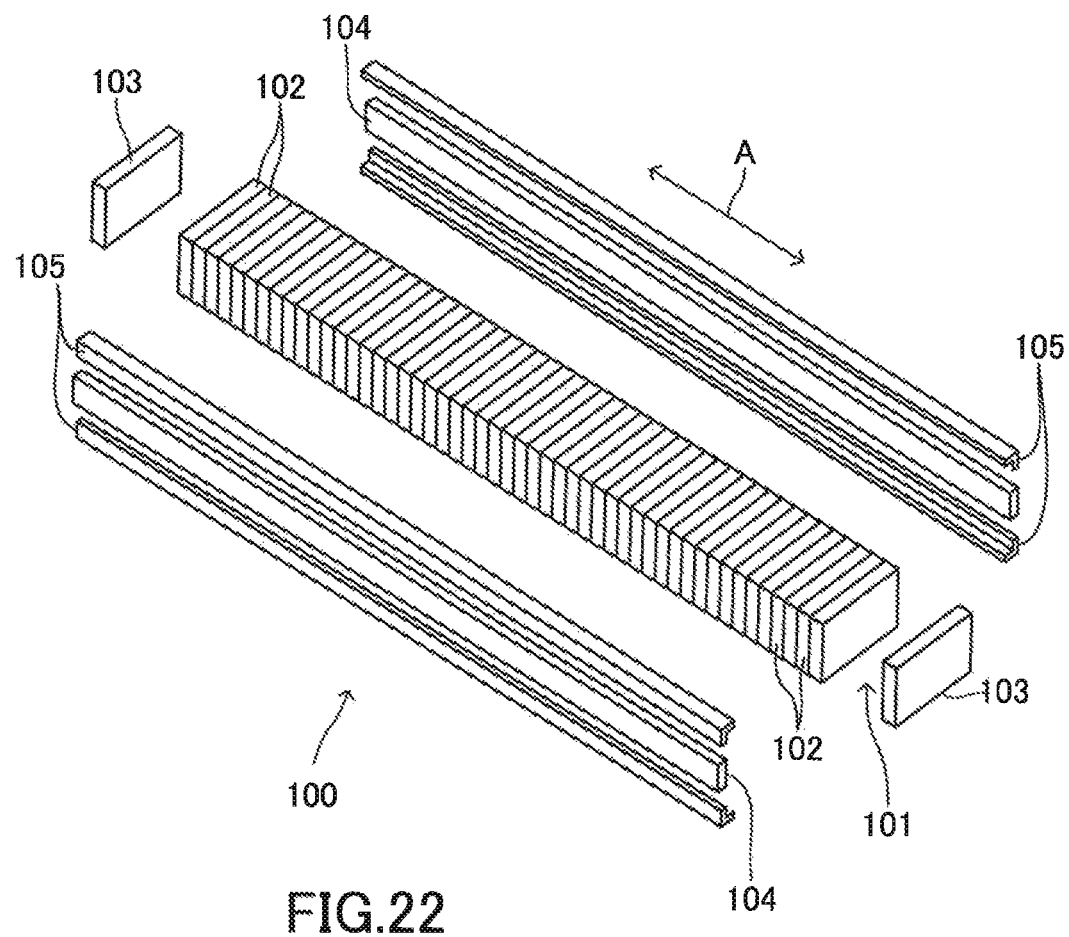
FIG. 22 is an exploded perspective view of a battery stack, a cooling device, and a battery cell holding member, of a comparison example.
Figure 23:
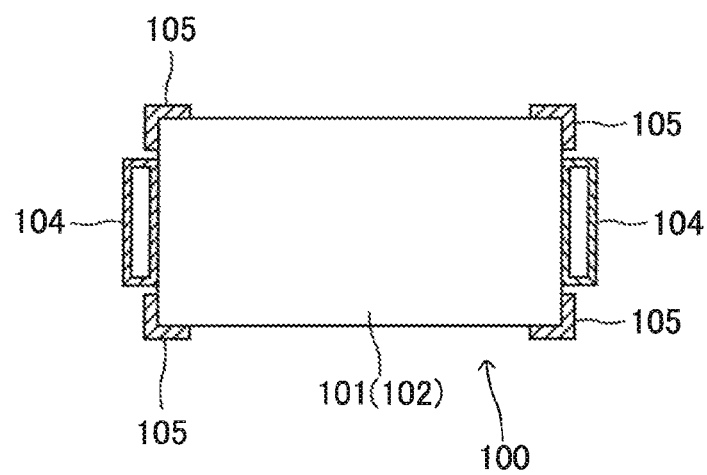
FIG. 23 is a transverse plane view of the comparison example shown in FIG. 22.
Figure 24:
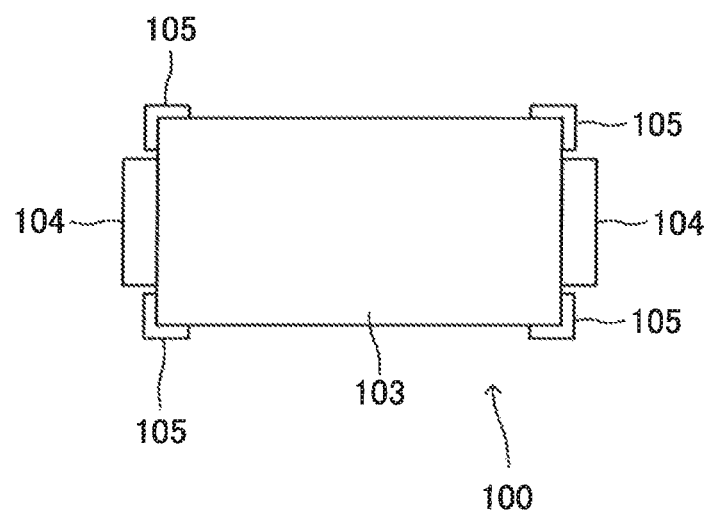
FIG. 24 is a side view of one of end members, the cooling device, and the battery cell holding member, of the comparison example shown in FIG. 22.

A second modification shown in FIGS. 19 to 21 may be employed when implementing the present invention. A battery device 10B according to the second modification includes a front member 30A and a rear member 30B. In other words, the front member 30 and the rear member 30 used in the battery device 10 are replaced with the front member 30A and the rear member 30B in the battery device 10B. Each of the front member 30A and the rear member 30B includes the upper restraining part 31 and the lower restraining part 32. A front-rear dimension (length in the front-rear direction) of the upper restraining part 31 of the battery device 10B of the second modification is longer than that of the battery device 10 of the above embodiment, and a front-rear dimension (length in the front-rear direction) of the lower restraining part 32 of the battery device 10B of the second modification is longer than that of the battery device 10 of the above embodiment.

As shown in FIGS. 20, and 21, upper-lower direction lengths (vertical dimensions) of the width-narrow part 33a and the width-wide part 33b in the second modification are longer than those of the above described embodiment, respectively. That is, the vertical dimension of the upper groove 33 of the battery device 10B is longer than that of the battery device 10 in the above described embodiment. Furthermore, in the second modification, a base end (proximal) part of the upper restraining part 31 is connected to an upper end part of the upper groove 33.

Similarly, as shown in FIGS. 19, and 21, upper-lower direction lengths (vertical dimensions) of the width-narrow part 34a and the width-wide part 34b in the second modification are longer than those of the above described embodiment, respectively. That is, the vertical dimension of the lower groove 34 of the battery device 10B is longer than that of the battery device 10 in the above described embodiment. Furthermore, in the second modification, a base end (proximal) part of the lower restraining part 32 is connected to a lower end part of the lower groove 34.

Therefore, in the elongated member 30 in the second modification formed by fixing the front member 30A and the rear member 30B to each other, a gap between a pair of the base end (proximal) parts of the upper restraining parts 31 is smaller than that of the above described embodiment, and a gap between a pair of the base end (proximal) parts of the lower restraining parts 32 is smaller than that of the above described embodiment.

In some modification, a cooling water may be used in the elongated member 30 of the battery device 10 of the above described embodiment as the refrigerant. In this case, similarly to the first modification, one of the ends of the water delivery tube 96 may be connected to the second connection opening 39g of the elongated member 30, and one of the ends of the water draining tube 97 may be connected to the first connection opening 39f of the elongated member 30.

In some modification, the heat exchange device 85 may be configured to contact an electric cooling device (not shown) installed in the vehicle. For example, when implemented in this fashion, the refrigerant RF which radiates the heat to the electric cooling device through the heat exchange device 85 flows into the elongated member 30 so as to sufficiently cool down the battery cells 22, even when an outside air temperature is extremely high (e.g., 50° C.). Therefore, the temperature of each battery cell 22 is maintained within the above-mentioned appropriate temperature range, even when an outside air temperature is extremely high. Furthermore, the heat exchange device 85 of the first modification shown in FIGS. 17, and 18 may be configured to contact the electric cooling device.

In some modification, the heat exchange device 85 may be configured to contact an electric heading device (not shown) installed in the vehicle. For example, when implemented in this fashion, the refrigerant RF which receives heat from the heating device through the heat exchange device 85 flows into the elongated member 30 so as to heat the battery cells 22, even when the outside air temperature is extremely low (e.g., −10° C.). Therefore, the temperature of each battery cell 22 is maintained within the above-mentioned appropriate temperature range, even when the outside air temperature is extremely low. Furthermore, the heat exchange device 85 of the first modification shown in FIGS. 17, and 18 may be configured to contact the electric heating device.

In some modifications, each of the battery modules 20 may include only one battery stack which is placed on one of the sides of the elongated member 30. In this case, the insulation heat transfer sheet 60 is sandwiched between the battery stack and the one of the sides of the elongated member 30.

The elongated member 30 and/or the elongated member 95 may be made of metal (e.g., aluminium, and alloy) other than iron.

The elongated member 30 and/or the elongated member 95 may be manufactured using a method (e.g., casting) other than press forming.

The front member 30A may be manufactured by:
manufacturing the temperature regulating part 30A1, the upper restraining part 31, and the lower restraining part 32 separately (independently); and
fixing (assembling) them to each other through, for example, welding.

The rear member 30B may be manufactured by:
manufacturing the temperature regulating part 30B1, the upper restraining part 31, and the lower restraining part 32 separately (independently); and
fixing (assembling) them to each other through, for example, welding.

The front member 30A and the rear member 30B may be fixed to each other by a fixing method other than laser welding. The end members may be fixed to the elongated member 30 and the restraining members 40 by a fixing method other than laser welding. The upper member 95A and the lower member 95B may be fixed to each other by a fixing method other than laser welding. The end members 50 may be fixed to the elongated member 95 by a fixing method other than laser welding.

The battery device 10 may be mounted on an object (device) other than the vehicle.

What is claimed is:

1. A battery device comprising:
a battery stack including a plurality of battery cells arranged along a predetermined straight direction;
a pair of end members that are spaced apart from each other in said straight direction and sandwich said battery stack in said straight direction to prevent each of said battery cells from moving in said straight direction;
a temperature adjusting part, which includes a heat exchange part for exchanging heat with said battery stack and a flowing passage in which a fluid for exchanging heat with said heat exchange part is flowing; and
an end member fixing part to which a pair of said end members are fixed, wherein,
said temperature adjusting part and said end member fixing part are integrally united into a single piece structure made of metal.

2. The battery device according to claim 1, wherein,
said single piece structure is configured to form said heat exchange part contacting a side surface of said battery stack which is placed at a side of said temperature adjusting part, said heat exchange part being a part of at least one of side surfaces of said temperature adjusting part.

3. The battery device according to claim 2, wherein,
said end member fixing part includes:
an upper restraining part, extending in one of side directions that are orthogonal to said straight direction and said an upper-lower direction from said temperature adjusting part and facing an upper surface of said battery stack from above, to which upper surfaces of said end members are fixed; and
a lower restraining part, extending in the one of said side directions from said temperature adjusting part and facing a lower surface of said battery stack from below, to which lower surfaces of said end members are fixed.

4. The battery device according to claim 3, wherein,
said end member fixing part includes a pair of said upper restraining parts and a pair of said lower restraining parts,
one of said upper restraining parts extending in said one of said side directions, and the other one of said upper restraining parts extending in the other one of said side directions, and
one of said lower restraining parts extending in said one of said side directions, and the other one of said lower restraining parts extending in the other one of said side directions.

5. The battery device according to claim 1, wherein,
said single piece structure includes a first member and a second member, each being a press formed piece,
one of surfaces as a first facing surface of said first member faces one of surfaces as a second facing surface of said second member,
said first member has a first concave part on said first facing surface,
said second member has a second concave part on said second facing surface, and
said first concave part and said second concave part form said flowing passage therebetween when said first member and said second member are connected to each other.

6. The battery device according to claim 5, wherein:
said first concave part includes a plurality of first upper-lower direction flow passage forming concave parts, each extending an upper-lower direction, that are arranged along said straight direction;
a plurality of parts, each located between said first upper-lower direction flow passage forming concave parts adjacent to each other, constitute a plurality of first ribs, each extending said upper-lower direction;
said second concave part includes a plurality of second upper-lower direction flow passage forming concave parts, each extending said upper-lower direction, that are arranged along said straight direction, the number of said second upper-lower direction flow passage forming concave parts being the same as the number of said first upper-lower direction flow passage forming concave parts;

a plurality of parts, each located between said second upper-lower direction flow passage forming concave parts adjacent to each other, constitute a plurality of second ribs, each extending said upper-lower direction, the number of said second ribs being the same as the number of said first ribs; and when each of said first ribs and each of said second ribs are fixed to each other, a plurality of upper-lower direction flow passages are formed by said first upper-lower direction flow passage forming concave parts and said second upper-lower direction flow passage forming concave parts.

7. The battery device according to claim 1, wherein:

said fluid is a refrigerant changing between a liquid phase fluid and a gas phase fluid, depending on its temperature, and said end member fixing part is fixed directly to said temperature adjusting part.

* * * * *